(12) United States Patent
Nobori

(10) Patent No.: US 7,965,342 B2
(45) Date of Patent: Jun. 21, 2011

(54) VIDEO IMAGE DISPLAY DEVICE AND VIDEO IMAGE DISPLAY METHOD

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1168 days.

(21) Appl. No.: 11/673,345

(22) Filed: Feb. 9, 2007

(65) Prior Publication Data

US 2007/0285574 A1    Dec. 13, 2007

(30) Foreign Application Priority Data

Mar. 13, 2006   (JP) ................. 2006-067128

(51) Int. Cl.
*H04N 5/57*     (2006.01)
*H04N 5/238*    (2006.01)
*H04N 5/14*     (2006.01)
*H04N 5/52*     (2006.01)

(52) U.S. Cl. ......... 348/687; 348/365; 348/673; 348/678

(58) Field of Classification Search .................. 348/672, 348/673, 678, 687, 647; 345/690; 385/690
See application file for complete search history.

(56) References Cited

U.S. PATENT DOCUMENTS

| 7,528,849 | B2 * | 5/2009 | Borel et al. ................... 345/690 |
| 2003/0086265 | A1 | 5/2003 | Ilsaka et al. |
| 2003/0123747 | A1 * | 7/2003 | Yang et al. .................... 382/254 |
| 2006/0029289 | A1 * | 2/2006 | Yamaguchi et al. .......... 382/274 |

FOREIGN PATENT DOCUMENTS

| JP | A 2001-343957 | 12/2001 |
| JP | B2 3308234    | 5/2002  |
| JP | A 2003-288140 | 10/2003 |
| JP | A 2004-032207 | 1/2004  |
| JP | A 2004-032551 | 1/2004  |
| JP | A 2004-045634 | 2/2004  |
| JP | A 2004-282661 | 10/2004 |
| JP | A 2004-294784 | 10/2004 |
| JP | A 2005-184048 | 7/2005  |
| JP | A 2006-120030 | 5/2006  |

* cited by examiner

*Primary Examiner* — Jefferey Harold
*Assistant Examiner* — Chandraika Sugrim
(74) *Attorney, Agent, or Firm* — Oliff & Berridge, PLC

(57) ABSTRACT

A video image display device is provided. The device includes an expansion factor deriving unit deriving and outputting an expansion factor for each frame of the video image data, for use in a luminance range expansion process for expanding a luminance range of the video image data on the basis of an image characterizing quantity related to the luminance of the video image data corresponding to the frame; a luminance range expansion processing unit performing the luminance range expansion process to the video image data on the basis of the expansion factor output from the expansion factor deriving unit; and a scene-change detecting unit detecting a change in a screen state of a present frame into a black screen state on the basis of the video image data and detecting a scene-change indicating that the scene of the video image has changed.

22 Claims, 22 Drawing Sheets

VIDEO IMAGE DISPLAY DEVICE AND VIDEO IMAGE DISPLAY METHOD

BACKGROUND

1. Technical Field

The present invention relates to a technique for displaying video images on the basis of video image data.

2. Related Art

In a video image display device such as projectors, there have been proposed techniques for performing a luminance range expansion process for expanding a luminance range of image data in one frame of video image data, thereby improving a sense of contrast of the image.

In addition, in a video image display device such as projectors equipped with an illumination device, there have been proposed techniques for performing a lighting control process for adjusting the luminance of the image, thereby improving image quality. Examples of the related art include JP-A-2001-343957, JP-A-2004-45634 and Japanese Patent No. 3308234.

However, according to the luminance range expansion process known in the art, since the luminance range expansion process is performed to the video image data without consideration of an abrupt change of the image (i.e., luminance of the image) between frames, there is a possibility that the image quality is deteriorated by the luminance range expansion process. For example, at the time of a scene-change in the video image, there are cases where a previous scene fades out into a black screen and a next scene fades in from the black screen. In this case, an expansion rate of the luminance may increase in a period until the next scene fades in from the black screen. When the luminance expansion rate increases, the video image data of the next scene is excessively expanded. Therefore, there is a possibility of causing deterioration of the image quality known as halation.

The abrupt image change between frames will be referred to as a scene-change.

Moreover, according to the lighting control process known in the art, since the lighting control process is performed without consideration of the scene-change, there is a possibility that the lighting control process deteriorates the image quality.

SUMMARY

An advantage of some aspects of the invention is that it provides a technique for performing a luminance range expansion process suitably for a new scene after a scene-change period. An advantage of another aspect of the invention is that it provides a technique for performing a lighting control process suitably for a new scene after a scene-change period.

According to an aspect of the invention, there is provided a video image display device displaying video images on the basis of video image data, in which the device includes an expansion factor deriving unit deriving and outputting an expansion factor for each frame of the video image data, for use in a luminance range expansion process for expanding a luminance range of the video image data on the basis of an image characterizing quantity related to the luminance of the video image data corresponding to the frame; a luminance range expansion processing unit performing the luminance range expansion process to the video image data on the basis of the expansion factor output from the expansion factor deriving unit; and a scene-change detecting unit detecting a change in a screen state of a present frame into a black screen state on the basis of the video image data and detecting a scene-change indicating that the scene of the video image has changed. Moreover, the expansion factor deriving unit is configured to output an ideal expansion factor of the present frame determined on the basis of the image characterizing quantity related to the present frame when the scene-change is detected; output a first modified expansion factor of the present frame obtained by modifying the ideal expansion factor of the present frame in accordance with a predetermined first expansion factor modification rule when the scene-change is not detected and the change into the black screen state is not detected; and output a second modified expansion factor of the present frame obtained by modifying the ideal expansion factor of the present frame to a value smaller than the first modified expansion factor of the present frame in accordance with a predetermined second expansion factor modification rule when the scene-change is not detected and the change into the black screen state is detected.

According to the above aspect of the invention, the expansion factor deriving unit outputs an ideal expansion factor of the present frame suitable for a new scene when the scene-chance is detected; outputs a first modified expansion factor of the present frame obtained by modifying the ideal expansion factor of the present frame in accordance with a predetermined first expansion factor modification rule when the scene-change is not detected and the change into the black screen state is not detected; and outputs a second modified expansion factor of the present frame obtained by modifying the ideal expansion factor of the present frame to a value smaller than the first modified expansion factor of the present frame in accordance with a predetermined second expansion factor modification rule when the scene-change is not detected and the change to the black screen state is detected. Accordingly, in the case of the scene-change where the scene fades out from a previous scene to change into the black screen and the black screen fades into a next scene, it is possible to suppress the abrupt change of the expansion factor from the previous frame, thereby making it possible to perform the luminance range expansion process suitably for the new scene.

In the above aspect, the expansion factor deriving unit may be configured to derive an ideal expansion factor difference obtained by subtracting a real expansion factor of a previous frame used in the luminance range expansion process for the previous frame by the luminance range expansion processing unit from the ideal expansion factor of the present frame; derive the first modified expansion factor of the present frame such that an absolute value of the first modified expansion factor difference obtained by subtracting the real expansion factor of the previous frame from the first modified expansion factor of the present frame is smaller than an absolute value of the ideal expansion factor difference and the sign of the first modified expansion factor difference is identical to the sign of the ideal expansion factor difference; and derive the second modified expansion factor of the present frame such that a absolute value of the second modified expansion factor difference obtained by subtracting the real expansion factor of the previous frame from the second modified expansion factor of the present frame is smaller than the absolute value of the first modified expansion factor difference of the present frame and the sign of the second modified expansion factor difference is identical to the sign of the ideal expansion factor difference.

According to this arrangement, the first modified expansion factor of the present frame is derived such that an absolute value of the first modified expansion factor difference is smaller than an absolute value of the ideal expansion factor difference and the sign of the first modified expansion factor difference is identical to the sign of the ideal expansion factor difference, and the second modified expansion factor of the present frame is derived such that an absolute value of the second modified expansion factor difference is smaller than the absolute value of the first modified expansion factor difference of the present frame and the sign of the second modified expansion factor difference is identical to the sign of the ideal expansion factor difference. Accordingly, it is possible to suppress the abrupt change of the expansion factor from the previous frame when the scene-change is not detected.

In the above aspect, the expansion factor deriving unit may be configured to output the ideal expansion factor until a predetermined scene-change stop condition is satisfied when the scene-change is detected; and output the first modified expansion factor of the present frame when the scene-change stop condition is satisfied.

According to this arrangement, the ideal expansion factor is output until a predetermined scene-change stop condition is satisfied when the scene-change is detected. Accordingly, it is possible to perform the luminance range expansion process suitably for the respective scenes until a predetermined scene-change stop condition is satisfied when the scene-change is detected.

In the above aspect, the scene-change stop condition may include at least one of a condition that the difference obtained by subtracting the ideal expansion factor or the present frame from the first modified expansion factor of the present frame is equal to or smaller than a predetermined threshold value; and a condition that the ideal expansion factor of the present frame is greater than the ideal expansion factor of the previous frame derived by the expansion factor deriving unit.

In the above aspect, the expansion factor deriving unit may be configured to output the second modified expansion factor of the present frame until a predetermined black screen stop condition is satisfied when the scene-change is not detected and the black screen state is detected; and output the first modified expansion factor of the present frame when the black screen stop condition is satisfied.

According to this arrangement, the second modified expansion factor of the present frame is output until a predetermined black screen stop condition is satisfied when the scene-change is not detected and the black screen state is detected, and the first modified expansion factor of the present frame is output when the black screen stop condition is satisfied. Accordingly, it is possible to suppress the change of the expansion factor.

In the above aspect, the scene-change detecting unit may be configured to detect the change into the black screen state when a black screen condition is satisfied, wherein the black screen condition including any one of a condition that a white peak value corresponding to a maximum luminance value of the image data is equal to or smaller than a predetermined black screen threshold value for the white peak; and a condition that an average level value corresponding to an average luminance level of the image data is equal to or smaller than a predetermined black screen threshold value for the average level.

According to this arrangement, it is possible to easily detect the change into the black screen state.

In the above aspect, the scene-change detecting unit may be configured to detect the scene-change when a start condition is satisfied, wherein the start condition includes a condition that the screen of the present frame is changed into a dark screen state brighter than the black screen state and a condition that the difference obtained by subtracting the ideal expansion factor of the present frame from the first modified expansion factor of the present frame is greater than a predetermined threshold value.

According to this arrangement, even when the change into the dark screen state is detected, it is possible to ignore the detection of the scene change if the difference obtained by subtracting the ideal expansion factor for the present frame from the first modified expansion factor for the present frame and it does not make any problem to output the first modified expansion factor for the present frame.

In the above aspect, the scene-change detecting unit may be configured to detect the change into the black screen state when a black screen condition is satisfied, the black screen condition including any one of a condition that a white peak value corresponding to a maximum luminance value of the image data is equal to or smaller than a predetermined black screen threshold value for the white peak and a condition that an average level value corresponding to an average luminance level of the image data is equal to or smaller than a predetermined black screen threshold value for the average level and detect the change into the dark screen state when a dark screen condition is satisfied, the dark screen condition including any one of a condition that the white peak value is greater than the black screen threshold value for the white peak and equal to or smaller than a predetermined dark screen threshold value for the white peak and a condition that the average level value is greater than the predetermined black screen threshold value for the average level and equal to or smaller than a predetermined dark screen threshold value for the average level.

According to this arrangement, it is possible to easily detect the change into the dark screen state and the change into the black screen state.

In the above aspect, the scene-change detecting unit may be configured to detect the scene-change when the proportion of those images having luminance equal to or greater than a predetermined limit value after performing the luminance range expansion process to the image data using the first modified expansion factor of the present frame, with respect to the entire image, is equal to or greater than a predetermined threshold value.

According to this arrangement, it is possible to output the ideal expansion factor for the present frame when the proportion of those images having luminance equal to or greater than a predetermined limit value after performing the luminance range expansion process to the image data using the first modified expansion factor of the present frame, with respect to the entire image, is equal to or greater than a predetermined threshold value. Accordingly, it is possible to perform the luminance range expansion process suitably for the new scene.

In the above aspect, the image characterizing quantity may include a plurality of image characterizing quantities obtainable from a luminance histogram of the image data, and the expansion factor deriving unit may derive the ideal expansion factor with reference to a predetermined expansion factor lookup table by the use of the plurality of image characterizing quantities.

According to this arrangement, since the luminance range expansion process is performed to the image data on the basis of the plurality of image characterizing quantities, it is possible to perform the luminance range expansion process suitably for the image data.

In the above aspect, the video image display device may further include a illumination device; a lighting factor deriving unit deriving and outputting a lighting factor for each frame of the video image data, indicating a light quantity of the illumination device on the basis of the image characterizing quantity; and a lighting unit performing a lighting control process of the illumination device on the basis of the lighting factor output from the lighting factor deriving unit. Moreover, the lighting factor deriving unit may be configured to output an ideal lighting factor of the present frame determined on the basis of the image characterizing quantity related to the present frame when the scene-change is detected; output a first modified lighting factor of the present frame obtained by modifying the ideal lighting factor of the present frame in accordance with a predetermined first lighting factor modification rule when the scene-change is not detected and the change into the black screen state is not detected; and output a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected.

According to this arrangement, the lighting factor deriving unit outputs an ideal lighting factor of the present frame suitable for a new scene when the scene-change is detected; outputs a first modified lighting factor of the present frame obtained by modifying the ideal lighting factor of the present frame in accordance with a predetermined first lighting factor modification rule when the scene-change is not detected and the chance into the dark screen state and the black screen state is not detected; and outputs a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected. Accordingly, in the case of the scene-change where the scene fades out from a previous scene to change into the black screen and the black screen fades into a next scene, it is possible to suppress the abrupt change of the lighting factor from the previous frame, thereby making it possible to perform the lighting control process suitably for the new scene.

According to another aspect of the invention, there is provided a video image display device displaying video images on the basis of video image data, in which the device includes a illumination device; a lighting factor deriving unit deriving and outputting a lighting factor for each frame of the video image data, indicating a light quantity of the illumination device on the basis of an image characterizing quantity related to the luminance of the video image data corresponding to the frame; a lighting unit performing a lighting control process of the illumination device on the basis of the lighting factor output from the lighting factor deriving unit; and a scene-change detecting unit detecting a change in a screen state of a present frame into a black screen state on the basis of the video image data and detecting a scene-change indicating that the scene of the video image has changed. Moreover, the lighting factor deriving unit is configured to output an ideal lighting factor of the present frame determined on the basis of the image characterizing quantity related to the present frame when the scene-change is detected; output a first modified lighting factor of the present frame obtained by modifying the ideal lighting factor of the present frame in accordance with a predetermined first lighting factor modification rule when the scene-change is not detected and the change into the black screen state is not detected; and output a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected.

According to the above aspect of the invention, the lighting factor deriving unit outputs an ideal lighting factor of the present frame suitable for a new scene when the scene-change is detected; outputs a first modified lighting factor of the present frame obtained by modifying the ideal lighting factor of the present frame in accordance with a predetermined first lighting factor modification rule when the scene-change is not detected and the change into the black screen state is not detected; and outputs a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected. Accordingly, in the case of the scene-change where the scene fades out from a previous scene to change into the black screen and the black screen fades into a next scene, it is possible to suppress the abrupt change of the lighting factor from the previous frame, thereby making it possible to perform the lighting control process suitably for the new scene.

In the above aspect, the lighting factor deriving unit may be configured to derive an ideal lighting factor difference obtained by subtracting a real lighting factor of a previous frame used in the lighting control process for the previous frame by the lighting unit from the ideal lighting factor of the present frame; derive the first modified lighting factor of the present frame such that an absolute value of the first modified lighting factor difference obtained by subtracting the real lighting factor of the previous frame from the first modified lighting factor of the present frame is smaller than an absolute value of the ideal lighting factor difference and the sign of the first modified lighting factor difference is identical to the sign of the ideal lighting factor difference; and derive the second modified lighting factor of the present frame such that an absolute value of the second modified lighting factor difference obtained by subtracting the real lighting factor of the previous frame from the second modified lighting factor of the present frame is smaller than the absolute value of the first modified lighting factor difference of the present frame and the sign of the second modified lighting factor difference is identical to the sign of the ideal lighting factor difference.

According to this arrangement, the first modified lighting factor of the present frame is derived such that an absolute value of the first modified lighting factor difference is smaller than an absolute value of the ideal lighting factor difference and the sign of the first modified lighting factor difference is identical to the sign of the ideal lighting factor difference, and the second modified lighting factor of the present frame is derived such that an absolute value of the second modified lighting factor difference is smaller than the absolute value of the first modified lighting factor difference of the present frame and the sign of the second modified lighting factor difference is identical to the sign of the ideal lighting factor difference. Accordingly, it is possible to suppress the abrupt change of the lighting factor from the previous frame when the scene-change is not detected.

In the above aspect, the lighting factor deriving unit may be configured to output the ideal lighting factor of the present frame until a predetermined scene-change stop condition is satisfied when the scene-change is detected; and output the first modified lighting factor of the present frame when the scene-change stop condition is satisfied.

According to this arrangement, the ideal lighting factor of the present frame is output until a predetermined scene-change stop condition is satisfied when the scene-change is detected. Accordingly, it is possible to perform the lighting control process suitably for the respective scenes until a predetermined scene-change stop condition is satisfied when the scene-change is detected.

In the above aspect, the scene-change stop condition may include at least one of a condition that the difference obtained by subtracting the ideal lighting factor of the present frame from the first modified lighting factor of the present frame is equal to or smaller than a predetermined threshold value; and a condition that the ideal lighting factor of the present frame is greater than the ideal lighting factor of the previous frame derived by the lighting factor deriving unit.

In the above aspect, the lighting factor deriving unit may be configured to output the second modified lighting factor of the present frame until a predetermined black screen stop condition is satisfied when the scene-change is not detected and the black screen state is detected; and output the first modified lighting factor of the present frame when the black screen stop condition is satisfied.

According to this arrangement, the second modified lighting factor of the present frame is output until a predetermined black screen stop condition is satisfied when the scene-change is not detected and the black screen state is detected, and the first modified lighting factor of the present frame is output when the black screen stop condition is satisfied. Accordingly, it is possible to suppress the change of the lighting factor.

In the above aspect, the scene-change detecting unit may be configured to detect the change into the black screen state when a black screen condition is satisfied, wherein the black screen condition including any one of a condition that a white peak value corresponding to a maximum luminance value of the image data is equal to or smaller than a predetermined black screen threshold value for the white peak; and a condition that an average level value corresponding to an average luminance level of the image data is equal to or smaller than a or determined black screen threshold value for the average level.

According to this arrangement, it is possible to easily detect the change into the black screen state.

In the above aspect, the scene-change detecting unit may be configured to detect the scene-change when a start condition is satisfied, wherein the start condition includes a condition that the screen of the present frame is changed into a dark screen state brighter than the black screen state; and a condition that the difference obtained by subtracting the ideal expansion factor of the present frame from the first modified expansion factor of the present frame is greater than a predetermined threshold value.

According to this arrangement, even when the change into the dark screen state is detected, it is possible to ignore the detection of the scene-change if the difference obtained by subtracting the ideal lighting factor for the present frame from the first modified lighting factor for the present frame and it does not make any problem to output the first modified lighting factor for the present frame.

In the above aspect, the scene-change detecting unit may be configured to detect the change into the black screen state when a black screen condition is satisfied, the black screen condition including any one of a condition that a white peak value corresponding to a maximum luminance value of the image data is equal to or smaller than a predetermined black screen threshold value for the white peak and a condition that an average level value corresponding to an average luminance level of the image data is equal to or smaller than a predetermined black screen threshold value or the average level; and detect the change into the dark screen state when a dark screen condition is satisfied, the dark screen condition including any one of a condition that the white peak value is greater than the black screen threshold value for the white peak and equal to or smaller than a predetermined dark screen threshold value for the white peak and a condition that the average level value is greater than the predetermined black screen threshold value for the average level and equal to or smaller than a predetermined dark screen threshold value for the average level.

According to this arrangement, it is possible to easily detect the change into the dark screen state and the change into the black screen state.

In the above aspect, the image characterizing quantity may include a plurality of image characterizing quantities obtainable from a luminance histogram of the image data. Moreover, the lighting factor deriving unit may derive the ideal lighting factor with reference to a predetermined lighting factor lookup table by the use of the plurality of image characterizing quantities.

According to this arrangement, since the lighting control process is performed to the image data on the basis of the plurality of image characterizing quantities, it is possible to perform the lighting control process suitably for the image data.

In addition, the invention may be realized through various other embodiments, such as a video image display method, a computer program for realizing the video image display device and the video image display method, or a recording medium having such a program recorded thereon.

When the invention is provided as a computer program or a recording medium having such a program recorded thereon, it may be provided as an entire program for controlling operation of a video image display device, or as an arrangement of units for carrying out the functions of the invention only. As recording media, there could be employed any of various kinds of computer-readable media, such as a flexible disk, CD-ROM, DVD-ROM, magnetic optical disk, IC card, ROM cartridge, punch card, printed matter having a bar code or other symbols imprinted thereon, a computer internal storage device (RAM, ROM or other such memory), or an external storage device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in the following order.
A. First Embodiment:
A1. Structure of Device:
A2. Processes of Image Characterizing Quality Calculating Unit:
A3. Processes of Expansion Factor Deriving Unit And Expansion Factor Output Mode Determining Unit:
A4. Processes of Lighting Factor Deriving Unit And Lighting Factor Output Mode Determining Unit:
A5. Derivation of Expansion Factor:
A6. Luminance Range Expansion Process:
A7. Derivation of Lighting Factor:
A8. Lighting Control Process:
A9. Advantage of Embodiment:
B. Second Embodiment:
C. Other Embodiments:

A. First Embodiment

A1. Structure of Device

Figure 1:
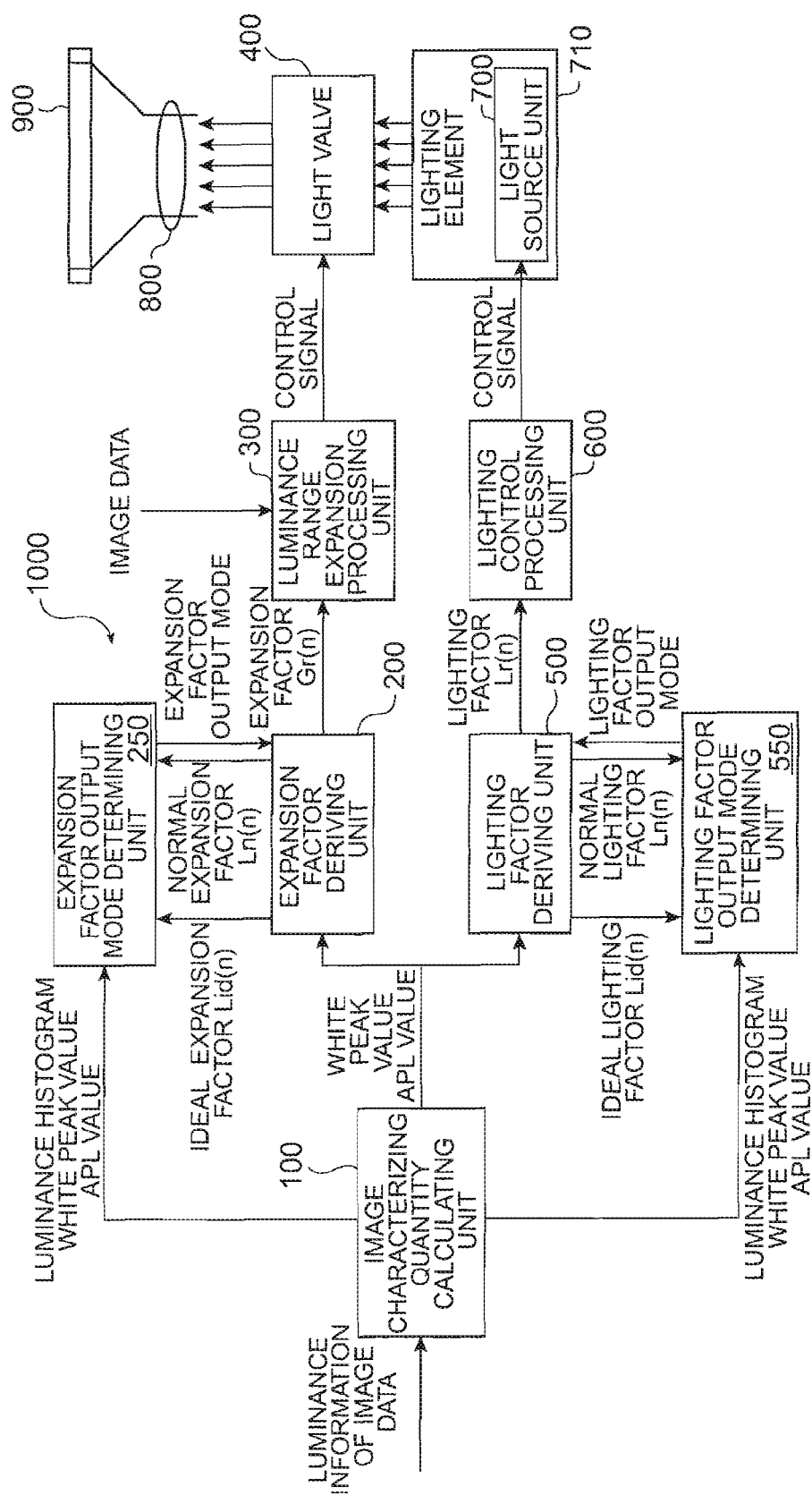
FIG. 1 is a schematic block diagram showing a functional structure of a video image display device 1000 according to a first embodiment of the invention.

FIG. 1 is a schematic block diagram showing a functional structure of a video image display device 1000 according to a first embodiment of the invention. The video image display device 1000 has a function of performing a luminance range expansion process for expanding a luminance range of image data in one frame of video image data and performing a lighting control process of a light source unit 710, on the basis of an image characterizing quantity of the image data. In addition, the video image display device 1000 has a function of detecting a change in a screen state of a present frame into a dark screen state or a black screen state and detecting the scene-change, i.e., an abrupt change of the image between frames, thereby performing the luminance range expansion process and the lighting control process on the basis of the detection result.

The video image displace device 1000 includes an image characterizing quantity calculating unit 100, an expansion factor deriving unit 200, an expansion factor output mode determining unit 250, a luminance range expansion processing unit 300, a light valve 400, a lighting factor deriving unit 500, a lighting factor output mode determining unit 550, a lighting control processing unit 600, a light source unit 710 and a projection type optical system 800. The video image display device 1000 is constructed by a projector and configured to modulate illumination light from the light source unit 710 using the light valve 400 so as to project and display image represented by the modulated light emitted from the light valve 400 on a screen 900 using the projection type optical system 800.

The light source unit 710 includes a lighting element 700 such as a liquid crystal panel constituted by switching transistors. The light source unit 710 corresponds to an illumination device of the embodiment of the invention, and the lighting element 700 corresponds to a lighting unit of the embodiment of the invention. The lighting unit is not limited to the lighting element and may be constructed by a louver disposed in front of the light source unit 710 to adjust the amount of light emitted from the light source unit 710.

The image characterizing quantity calculating unit 100 calculates an APL (average picture level value and a white peak value on the basis of the luminance of the mage data and outputs those values to expansion factor deriving unit 200, expansion factor output mode determining unit 250, lighting factor deriving unit 500 and lighting factor output mode determining unit 550. Details of the APL value and the white peak value will be described later. The image characterizing quantity calculating unit 100 generates a luminance histogram of the image data and outputs the histogram to the expansion factor output mode determining unit 250 and lighting factor output mode determining unit 550.

Hereinafter, functions of the expansion factor deriving unit 200 and the expansion factor output mode determining unit 250 will be described.

Figure 2:
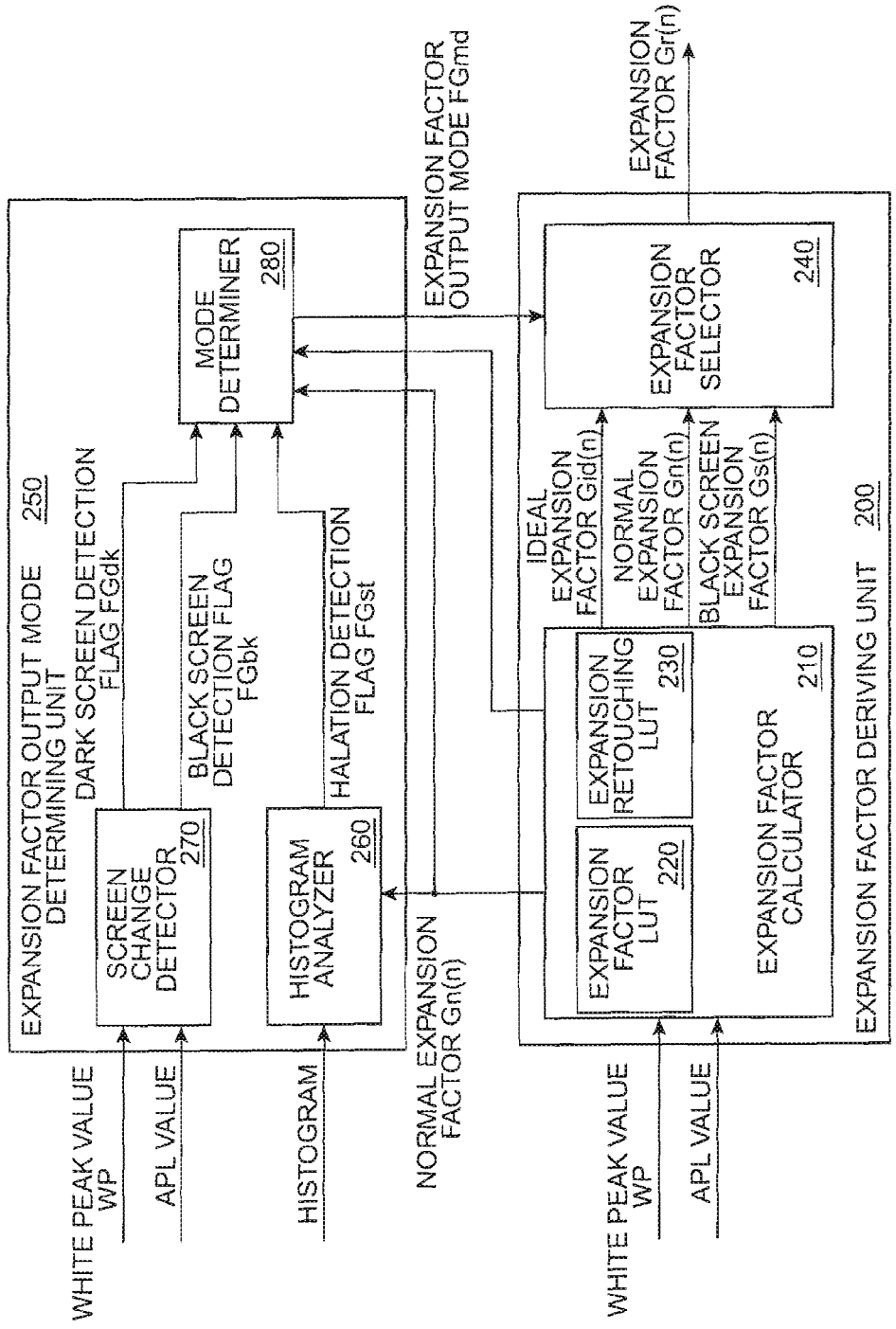
FIG. 2 is a block diagram showing an internal structure of an expansion factor deriving unit 200 and an expansion factor output mode determining unit 250.

FIG. 2 is a block diagram showing an internal structure of an expansion factor deriving unit 200 and an expansion factor output mode determining unit 250. The expansion factor deriving unit 200 is constituted by an expansion factor calculator 210 and an expansion factor selector 240. The expansion factor output mode determining unit 250 is constituted by a histogram analyzer 260, a screen change detector 270 and a mode determiner 280.

The expansion factor calculator 210 of the expansion factor deriving unit 200 derives an ideal expansion factor Gid with reference to an expansion factor lookup table (hereinafter, will be referred to as an expansion factor LUT) 220 by the use of the APL value and the white peak value WP. The expansion factor calculator 210 calculates a normal expansion factor Gn by modifying the ideal expansion factor Gid in accordance with a predetermined modification rule for the normal expansion factor and a modified normal variation derived with reference to a modified expansion lookup table (hereinafter, will be referred to as a modified expansion LUT) 230 and calculates a black screen expansion factor Gs by modifying the ideal expansion factor Gid in accordance with the modified normal variation and a predetermined modification rule for the black screen expansion factor. The expansion factor calculator 210 outputs the ideal expansion factor Gid, the normal expansion factor Gn and the black screen expansion factor Gs to the expansion factor selector 240. The normal expansion factor and the modification rule for the normal expansion factor correspond to a first modified expansion factor and a first expansion factor modification rule, respectively, and the black screen expansion factor and the modification rule for the black screen expansion factor correspond to a second modified expansion factor and a second expansion factor modification rule, respectively.

In the following description, it is assumed that the present frame is an n-th frame (n: a natural number). Moreover, the ideal expansion factor of n-th frame will be denoted by Gid(n). For example, the ideal expansion factor of (n−1)th frame is denoted by Gid(n−1). The normal expansion actor and the black screen expansion factor will be denoted in the same manner.

The screen change detector 270 of the expansion factor output mode determining unit 250 detects a change in a screen state of a present frame into a dark screen state or a black screen state on the basis of the APL value and the white peak value WP and outputs a dark screen detection flag FGdk indicating whether the screen state has changed into the dark screen state and a black screen detection flag FGbk indicating whether the screen state has changed into the black screen state, to the mode determiner 280.

The histogram analyzer 260 analyzes the image data using histogram to determine whether the image data causes halation after the luminance range expansion process and outputs a halation detection flag FGst indicating presence of halation to the mode determiner 280.

The mode determiner 280 detects presence of the scene-change on the basis of the dark screen detection flag FGdk, the black screen detection flag FGbk and the halation detection flag FGst and determines an expansion factor output mode. Moreover, the mode determiner 280 outputs an expansion factor output mode flag FGmd indicating the determination result to the expansion factor selector 240 of the expansion factor deriving unit 200.

The expansion factor selector 240 outputs one of the ideal expansion factor Gid(n), the normal expansion factor Gn(n) and the black screen expansion factor Gs(n), as an expansion factor (also referred to as a real expansion factor) Gr in accordance with the expansion factor output mode flag FGmd output from the mode determiner 280.

Details of processes of the expansion factor deriving unit 200 and the expansion factor output mode determining unit 250 will be described later.

Referring to FIG. 1, the luminance range expansion processing unit 300 performs the luminance range expansion process to the image data on the basis of the expansion factor Gr(n) output from the expansion factor deriving unit 200. Moreover, the luminance range expansion processing unit 300 controls the light valve 400 on the basis of the image data after the luminance range expansion process.

Hereinafter, functions of the lighting factor deriving unit 500 and the lighting factor output mode determining unit 550 will be described.

Figure 3:
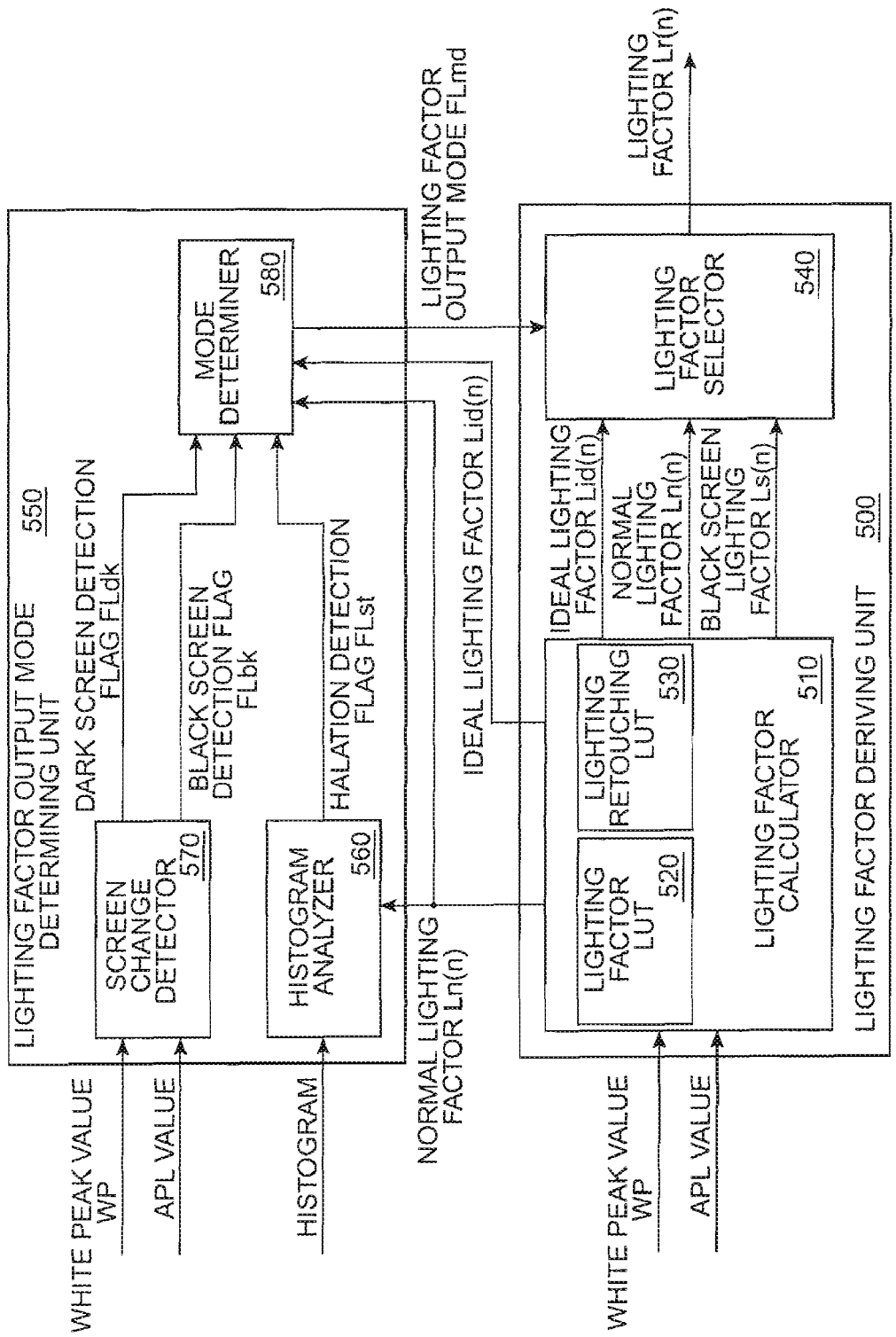
FIG. 3 is a block diagram showing an internal structure of a lighting factor deriving unit 500 and a lighting factor output mode determining unit 550.

FIG. 3 is a block diagram showing an internal structure of a lighting fact or deriving unit 500 and a lighting factor output mode determining unit 550. The lighting factor deriving unit 500 is constituted by a lighting factor calculator 510 and a lighting factor selector 540. The lighting factor output mode determining unit 550 is constituted by a histogram analyzer 560, a screen change detector 570 and a mode determiner 580.

The lighting factor calculator 510 of the lighting factor deriving unit 500 calculates an ideal lighting factor Lid(n) with reference to a predetermined lighting factor lookup table (hereinafter, will be referred to as a lighting factor LUT) 520 by the use of the APL value and the white peak value WP. The lighting factor calculator 510 calculates a normal lighting factor Ln(n) by modifying the ideal lighting factor Lid(n) in accordance with a predetermined modification rule for the normal lighting factor and a modified normal variation calculated with reference to a modified lighting lookup table (hereinafter, will be referred to as a modified lighting LUT) 530 and calculates a black screen expansion factor Ls(n) by modifying the ideal lighting factor Lid(n) in accordance with the modified normal variation and a predetermined modification rule for the black screen slighting factor. The lighting factor calculator 510 outputs the ideal lighting factor Lid(n), the normal lighting factor Ln(n) and the black screen lighting factor Ls(n) to the lighting factor selector 540. The normal lighting factor and the modification rule for the normal lighting factor correspond to a first modified lighting factor and a first lighting factor modification rule, respectively, and the black screen lighting factor and the modification rule for the black screen lighting factor correspond to a second modified lighting factor and a second lighting factor modification rule, respectively.

The screen change detector 570 of the lighting factor output mode determining unit 550 detects a change in a screen state of a present frame into a dark screen state or a black screen state on the basis of the APL value and the white peak value WP and outputs a dark screen detection flag FLdk indicating whether the screen state has changed into the dark screen state and a black screen detection flag FLbk indicating whether the screen state has changed into the black screen state, to a mode determiner 580.

The histogram analyzer 560 analyzes the image data using histogram to determine whether the image data causes halation after the luminance range expansion process and outputs a halation detection flag FLst indicating presence of halation to the mode determiner 580.

The mode determiner 580 detects presence of the scene-change on the basis of the dark screen detection flag FLdk, the black screen detection flat FLbk and the halation detection flag FLst and determines a lighting factor output mode. Moreover, the mode determiner 580 outputs a lighting factor output mode flag FLmd indicating the determination result to the lighting factor selector 540 of the lighting factor deriving unit 500.

The lighting factor selector 540 outputs one of the ideal lighting factor Lid(n), the normal lighting factor Ln(n) and the black screen lighting factor Ls(n), as a lighting factor (also referred to as a real lighting factor) Lr in accordance with the lighting factor output mode flag FLmd output from the mode determiner 580.

Operations in the histogram analyzer 560, the screen change detector 570 and the mode determiner 580 of the lighting factor output mode determining unit 550 are similar to those in the histogram analyzer 260, the screen change detector 270 and the mode determiner 280 of the expansion factor output mode determining unit 250.

Returning to FIG. 1, the lighting control processing unit 600 controls the lighting element 700 of a discharge lamp on the basis of the lighting factor Lr(n) output from the lighting factor deriving unit 500.

The expansion factor output mode determining unit 250 and the lighting factor output mode determining unit 550 correspond to a scene-change detecting unit of the embodiment of the invention.

A2. Processes of Image Characterizing Quantity Calculating Unit

The image characterizing quantity calculating unit 100 calculates the APL value and the white peak value WP on the basis of the luminance of the image data. The luminance Y of a pixel in the image data can be defined as Formula 1 or 2, for example.

$$Y=0.299R+0.587G+0.144B \quad \text{[Formula 1]}$$

$$Y=\max(R,G,B) \quad \text{[Formula 2]}$$

Figure 4:
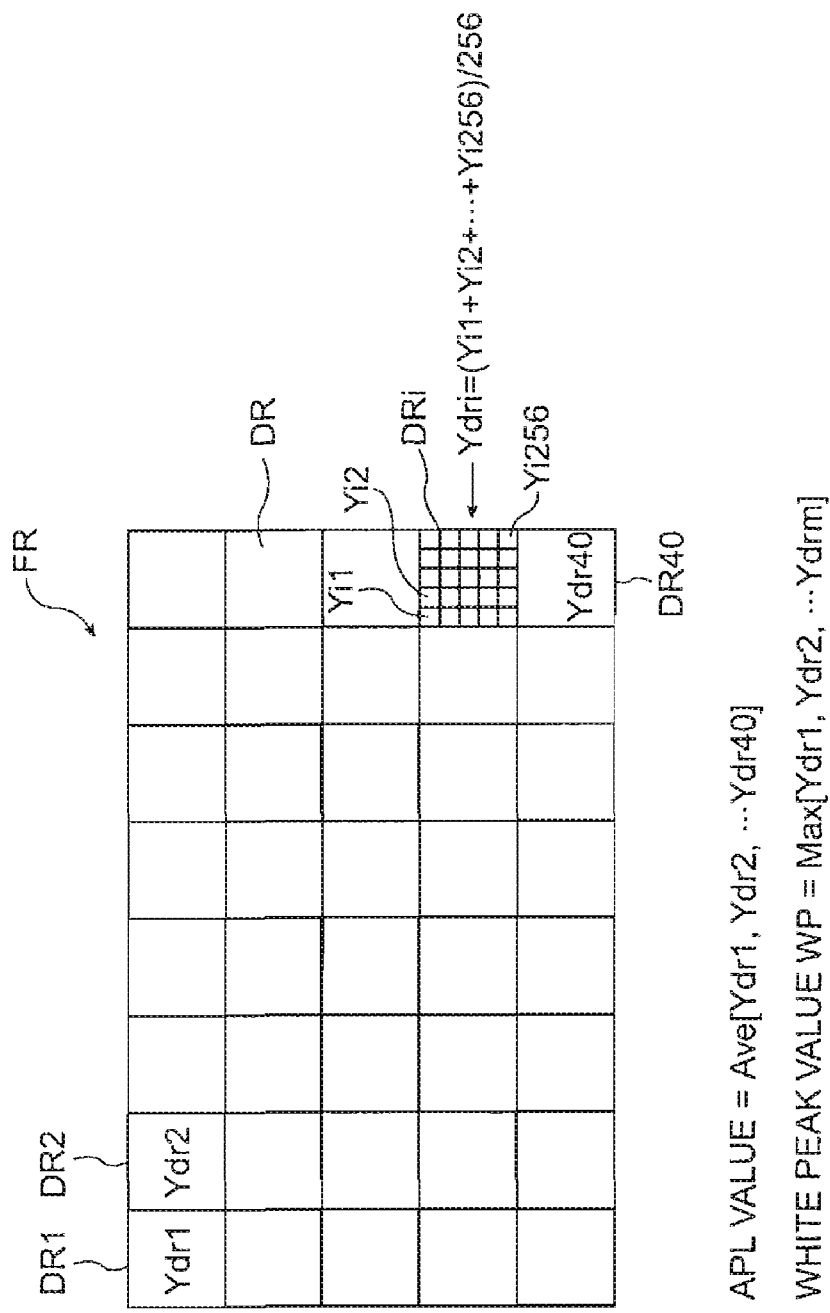
FIG. 4 is a diagram for explaining processes of an image characterizing quantity calculating unit 100.

FIG. 4 is a diagram for explaining processes of an image characterizing quantity calculating unit 100. First, the image characterizing quantity calculating unit 100 divides a frame FR into sub-regions DR having 16*16 pixels. In the example shown in FIG. 4, the frame FR is divided into 40 sub-regions DR1 to DR40. Assuming that the luminance of pixels in an i-th sub-region DRi of the 40 sub-regions DR1 to DR40 is denoted by Yi1 to Yi256, a representative luminance Ydri of the sub-region DRi can be expressed by Formula 3. In other words, the representative luminance Ydri of the sub-region DRi is an average value of luminance values of pixels in the sub-region DRi.

$$Ydri=(Yi1+Yi2+\ldots+Yi256)/256 \quad \text{[Formula 3]}$$

Although in FIG. 4, the sub-region DRi includes 25 pixels, actually, 256 pixels are included in the sub-region DRi.

The image characterizing quantity calculating unit 100 calculates representative luminance values Ydr1 to Ydr40 of the sub-regions DR1 to DR40 using Formula 3. The image characterizing quantity calculating unit 100 sets the average value of the representative luminance values Ydr1 to Ydr40 as the APL value and sets the maximum value of the representative luminance values Ydr1 to Ydr40 as the white peak value WP. In this case, the APL value and the white peak value WP are expressed in 10 bit. The sub-region DR may have an arbitrary size or number.

Figure 5:
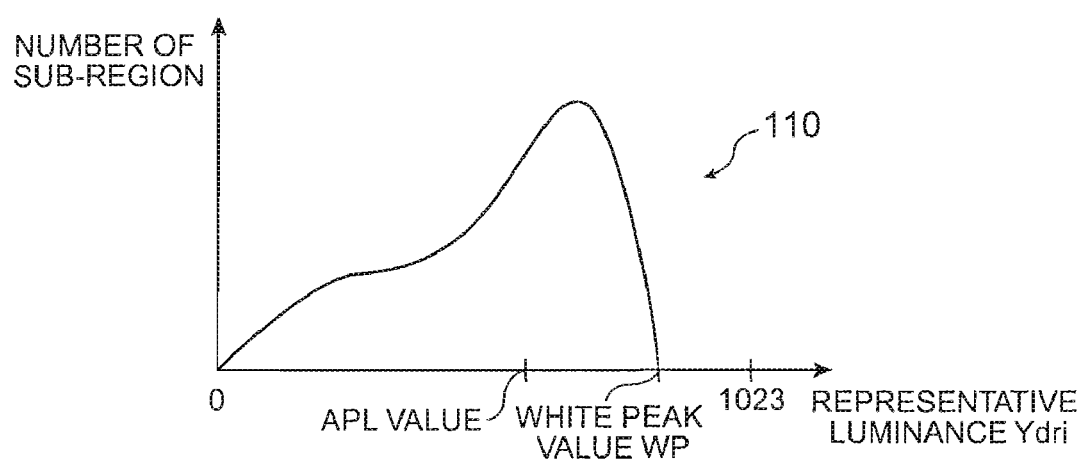
FIG. 5 is a graph showing a luminance histogram 110 of image data.

The image characterizing quantity calculating unit 100 generates a luminance histogram 110 of the image data as shown in FIG. 5. In FIG. 5, the horizontal axis represents the representative luminance Ydri of the sub-region DRi and the vertical axis represents the number of sub-regions.

A3. Processes of Expansion Factor Deriving Unit and Expansion Factor Output Mode Determining Unit The expansion factor Deriving Unit 200 derives the ideal expansion factor Gid(n), the normal expansion factor Gn(n) and the black screen expansion factor Gs(n) with reference to the expansion factor LUT 220 and the modified expansion LUT 230 by the use of the APL value and the white peak value WP. The expansion factor output mode determining unit 250 performs the expansion factor output mode determining process on the basis of the ideal expansion factor Gid(n), the normal expansion factor Gn(n) and the luminance histogram 110 generated by the image characterizing quantity calculating unit 100. The expansion factor output mode includes three kinds of output modes, i.e., a scene-change mode which continues until a predetermined stop condition is satisfied after a predetermined start condition is satisfied; a black screen mode which continues until a predetermined stop condition is satisfied after a predetermined start condition is satisfied; and a normal mode which continues until several start conditions are satisfied after several stop conditions are satisfied. Details of the start conditions and the stop conditions will be described later. The expansion factor deriving unit 200 outputs the ideal expansion factor Gid(n) when the expansion factor output mode is in the scene-change mode, outputs the black screen expansion factor Gs(n) when the expansion factor output mode is in the black screen mode, and outputs the normal expansion factor Gn(n) when the expansion factor output mode is in the normal mode.

Figure 6:
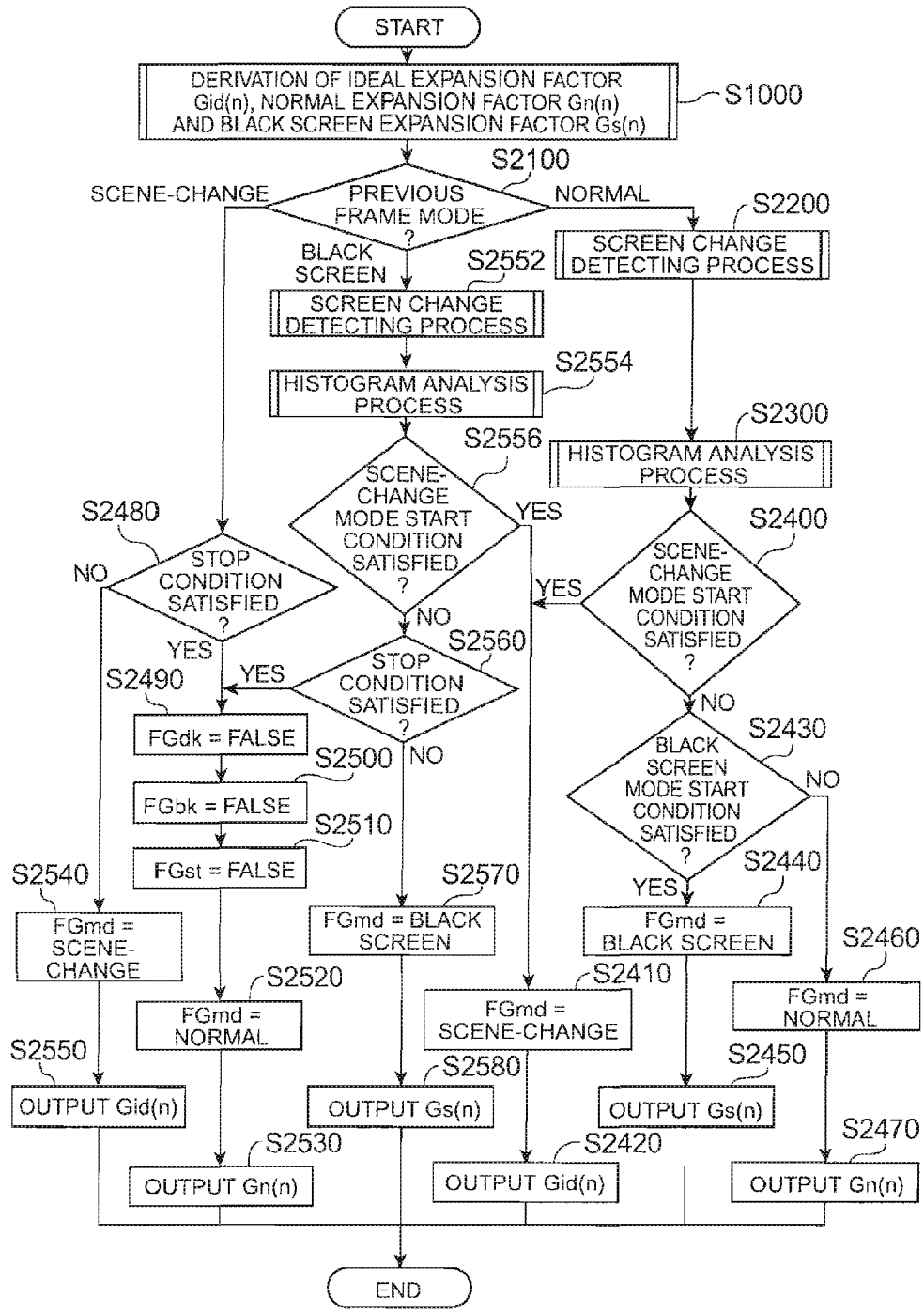
FIG. 6 is a flowchart showing processes of the expansion factor deriving unit 200 and the expansion factor output mode determining unit 250.

FIG. 6 is a flowchart showing processes of the expansion factor deriving unit 200 and the expansion factor output mode determining unit 250. First, the expansion factor calculator 210 of the expansion factor deriving unit 200 derives the ideal expansion factor Gid(n), the normal expansion factor Gn(n) and the black screen expansion factor Gs(n) (step S1000). Derivation of the ideal expansion factor Gid(n), the normal expansion factor Gn(n) and the black screen expansion factor Gs(n) will be described later. The expansion factor output mode determining unit 250 and the expansion factor deriving unit 200 perform processes in accordance with the expansion factor output mode for a previous frame (step S2100).

First, when the expansion factor output mode for the previous frame is in the normal mode (Normal in step S2100), the screen change detector 270 performs a screen change detecting process (step S2200) and the histogram analyzer 260 performs a histogram analyzing process (step S2300).

Figure 7:
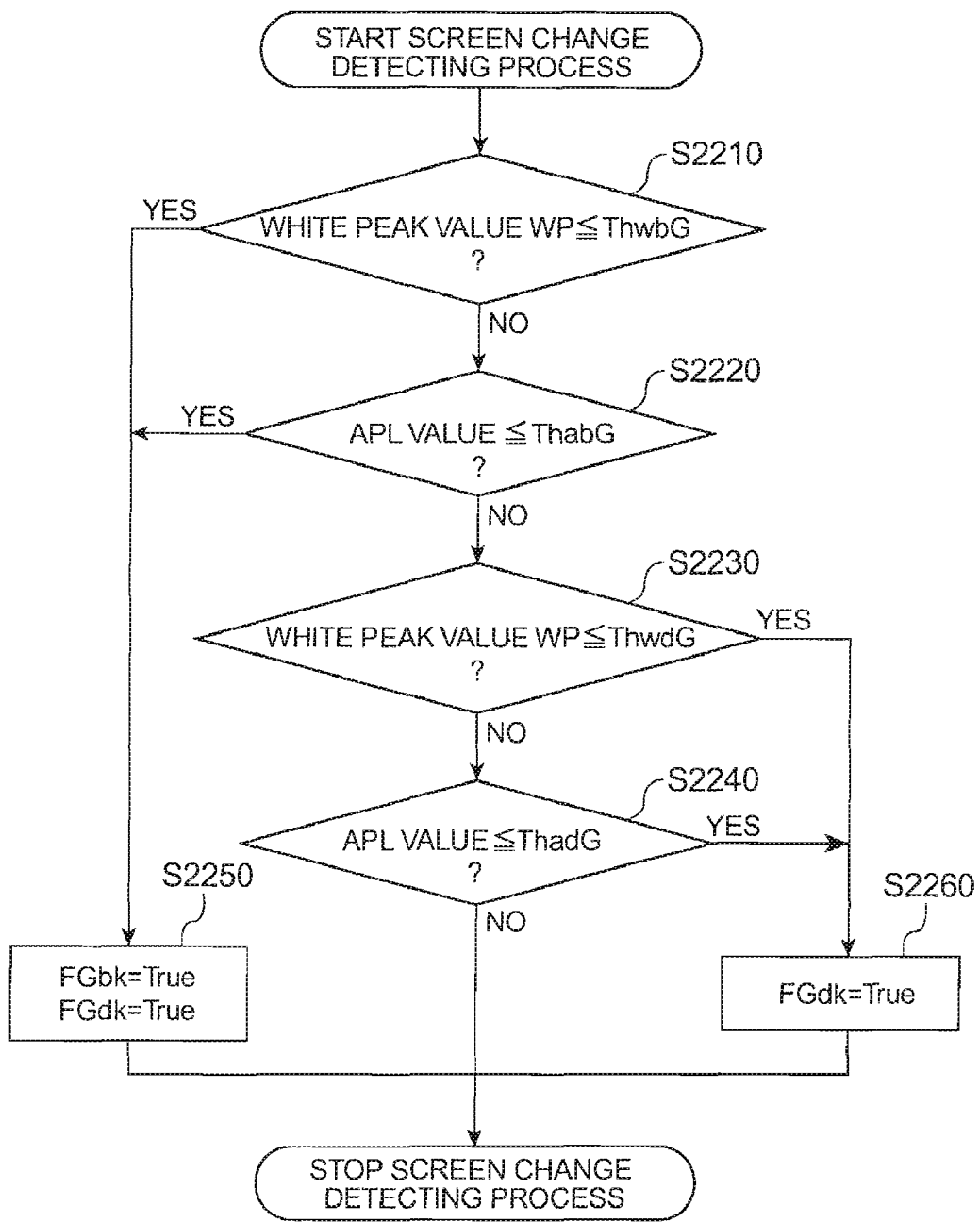
FIG. 7 is a flowchart showing a screen change detection process.

FIG. 7 is a flowchart showing a screen change detection process. The screen change detector 270 determines whether the white peak value WP corresponding to the maximum luminance value in the luminance histogram 110 is equal to or smaller than a predetermined white peak black screen threshold value ThwbG (step S2210), determines whether the APL value corresponding to the average luminance value in the luminance histogram 110 is equal to or smaller than a predetermined APL black screen threshold value ThabG (step S2220), determines whether the white peak value WP is equal to or smaller than a predetermined white peak dark screen threshold value ThwdG (step S2230), and determines whether the APL value is equal to or smaller than a predetermined APL dark screen threshold value ThadG (step S2240). When the white peak value WP is equal to or smaller than the white peak black screen threshold value Thwbg (Yes in step S2210) or the APL value is equal to or smaller than the APL black screen threshold value ThabG (Yes in step S2220), the values of the black screen detection flag FGbk and the dark screen detection flag FGdk are changed from an initial value [False] to [True] (step S2250). Moreover, when the white peak value WP is equal to or smaller than the white peak dark screen threshold value ThwdG (Yes in step S2230) or the APL value is equal to or smaller than the APL dark screen threshold value ThadG (Yes in step S2240), the value of the dark screen detection flag FGdk is changed from an initial value [False] to [True] (step S2490). The magnitude of the threshold values ThabG, ThadG, ThwbG and ThwdG is set to satisfy the following relation represented by Formula 4.

$$ThabG \leq ThwbG \leq ThadG \leq ThwdG \quad \text{[Formula 4]}$$

Figure 8:
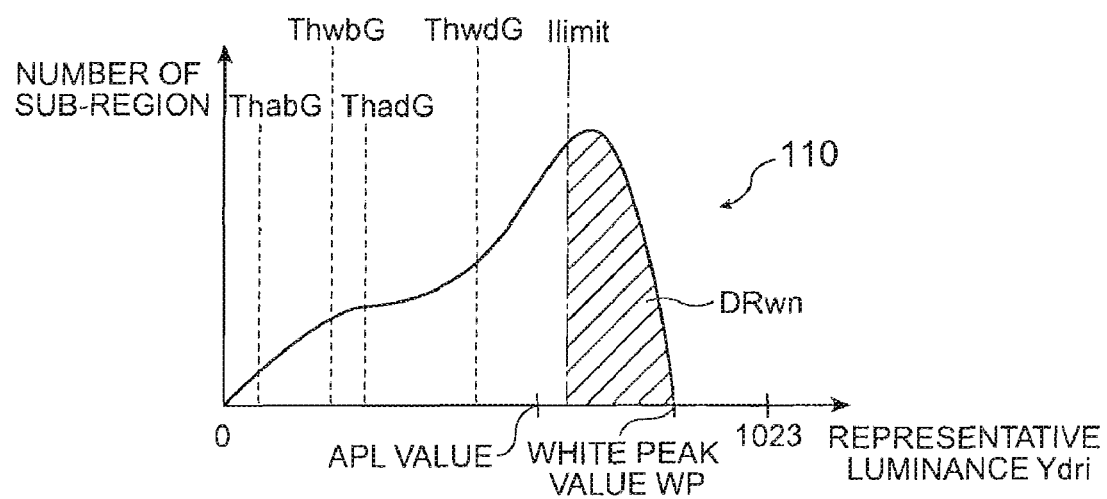
FIG. 8 is a graph for explaining details of the screen change detection process.

FIG. 8 is a graph for explaining details of the screen change detection process. The luminance histogram 110 shown in FIG. 8 is identical to the luminance histogram 110 shown in FIG. 5. In the example of FIG. 8, since the white peak value WP is greater than the white peak dark screen threshold value ThwdG indicated by a broken line and the APL value is greater than the APL dark screen threshold value ThadG indicated by a broken line, the determination results in steps S2210 to S2240 are "No". When the white peak value WP is smaller than the white peak dark screen threshold value ThwdG, the determination result in step S2230 is "Yes" and the value of the dark screen detection flag FGdk is changed from the initial value [False] to [True] (step S2260). When the white peak value WP is smaller than the white peak black screen threshold value ThwbG, the determination result in step S2210 is "Yes" and the value of the black screen detection flag FGbk is changed from the initial value [False] to [True] (step S2250). Similarly, when the APL value is smaller than the APL dark screen threshold value ThadG, the determination result in step S2240 is "Yes" and the value of the dark screen detection flag FGdk is changed from the initial value [False] to [True] (step S2260). In addition, when the APL value is smaller than the APL black screen threshold value ThabG, the determination result in step S2220 is "Yes" and the value of the black screen detection flag FGbk is changed from the initial value [False] to [True] (step S2250).

Figure 9:
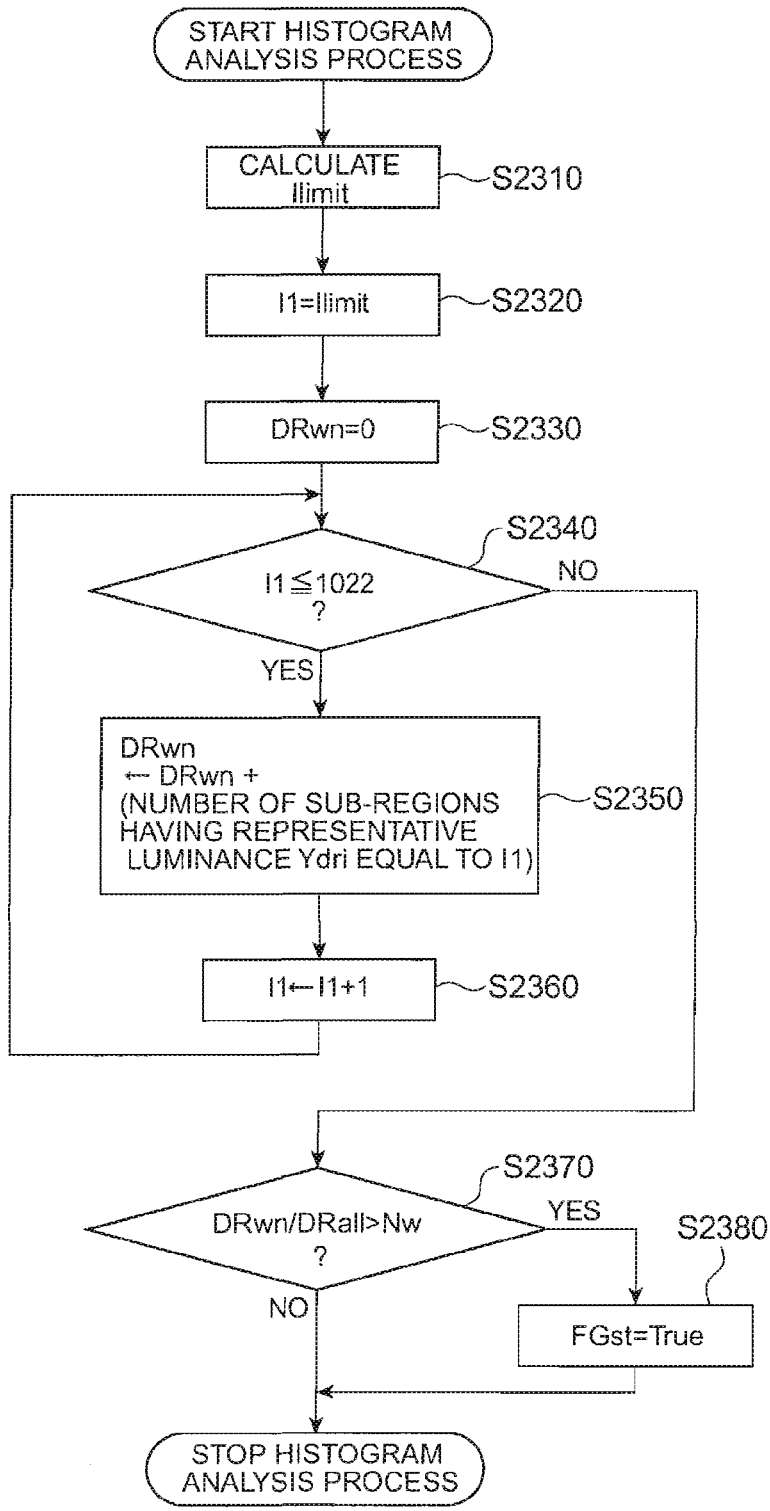
FIG. 9 is a flowchart showing a histogram analysis process.

FIG. 9 is a flowchart showing a histogram analysis process. First, the histogram analyzer 260 calculates a luminance limit value Ilimit represented by Formulae 5 and 6. In Formula 6, K1 represents an expansion ratio.

$$Ilimit = 1023/K1 \quad \text{[Formula 5]}$$

$$K1 = 1 + Gn(n)/256 \quad \text{[Formula 6]}$$

The luminance limit value Ilimit corresponds to a maximum luminance 1023 obtainable when performing the luminance range expansion process with the normal expansion factor $Gn(n)$. When the luminance range expansion process is performed using the normal expansion factor $Gn(n)$ to a sub-region DRi having luminance equal to or greater than the luminance limit value Ilimit before performing the luminance range expansion process, the representative luminance Ydri of the sub-region DRi becomes equal to or greater than the maximum luminance 1023, thereby producing halation, a phenomenon in which the sub-region DRi produces a blurred white image. In steps S2320 to S2360, the number DRwn of the sub-regions having representative luminance Ydri equal to or greater than the luminance limit value Ilimit and equal to or smaller than 1022, i.e., the number DRwn of sub-regions producing halation when performing the luminance range expansion process with the normal expansion factor $Gn(n)$ (hereinafter, will be referred to as the number DRwn of halation sub-region) is calculated. In FIG. 8, assuming that the luminance limit value Ilimit is represented by a dashed dotted line, the number of the halation sub-region DRwn corresponds to the size of hatched region.

First, a variable I1 is substituted with the luminance limit value Ilimit (step S2320), and the number of halation sub-region DRwn is substituted with zero (0) to initialize the number of halation sub-region DRwn (step S2330). When the variable I1 is equal to or smaller than 1022 (Yes in step S2340), the number of sub-regions DRi having representative luminance Ydri identical to the variable I1 is added to the number of halation sub-region DRwn (step S2350). Then, the variable I1 is incremented (step S2360) and processes of steps S2340 and S2350 are repeated. When the incremented variable I1 in step S2360 is greater than 1022 (No in step S2340), the number of halation sub-region DRwn at that moment is determined as the number of halation sub-region DRwn. Then, the histogram analyzer 260 determines whether the proportion of the number of halation sub-region DRwn with respect to the entire number of sub-regions DRall is greater than a halation threshold value Nw (step S2370). When the proportion is greater than the halation threshold value Nw (Yes in step S2370), the value of the halation detection flag FGst is changed to the initial value [False] to [True] (step S2380). In this embodiment, the number or sub-region DRi having representative luminance Ydri of 1023 is not added to the number of halation sub-region DRwn in order to exclude the sub-region Dri producing halation attributable to image quality deterioration from calculation. However, the number of sub-region DRi having representative luminance Ydri of 1023 may be added to the number of halation sub-region DRwn.

Returning to FIG. 6, the mode determiner 280 of the expansion factor output mode determining unit 250 determines whether either of the following scene-change mode start conditions 1 and 2 is satisfied (S2400).

Scene-change Mode Start Condition 1: the value of dark screen detection flag FGdk is [True]; and the value of (Gn(n)−Gid(n)) is greater than a start threshold value ThstrG (an integer equal to or greater than zero (0))

Scene-change Mode Start Condition 2: the value of halation detection flag FGst is [True]

The start condition 1 is set in accordance with the following concept. As described above, the dark screen detection flag FGdk becomes [True] when the white peak value WP is equal to or smaller than the white peak dark screen threshold value ThwdG or the APL value is equal to or smaller than the APL dark screen threshold value ThadG (step S2260 in FIG. 7). Since the white peak dark screen threshold value ThwdG or the APL dark screen threshold value ThadG has a sufficiently small value, the [True] value of the dark screen detection flag FGdk means that it may produce an extremely dark image. Generally, since black images are often inserted in the scene-change period, when the condition that the value of the dark screen detection flag FGdk is [True] is satisfied, it may be possible to determine that the scene-change has occurred. However, when the value of |Gn(n)−Gid(n)| is equal to or smaller than the start threshold value ThstrG, since the difference between the ideal expansion factor Gn(n) and the normal expansion factor Gn(n) is small, it does not make any problem to determine that it is in the normal mode where the normal expansion factor Gn(n) is output. Moreover, when the value of (Gn(n)−Gid(n)) becomes negative, since the ideal expansion factor Gid(n) becomes greater than the normal expansion factor Gn(n), it may be possible to determine that the screen darkens gradually. In this case, since there is little possibility of image quality deterioration due to the luminance range expansion process, it does not make any problem when determining that it is in the normal mode where the normal expansion factor Gn(n) is output. Therefore, the process proceeds to the scene-change mode when the above-mentioned start condition 1 that the value of dark screen detection flag FGdk is [True] and the value of (Gn(n)−Gid(n)) is greater than the start threshold value ThstrG is satisfied.

The halation detection flag FGst used in the start condition 2 becomes [True] when the proportion of the number of the halation sub-region DRwn with respect to the entire number of sub-regions DRall is greater than the halation threshold value Nw and becomes [False] when the proportion of the number of the halation sub-region DRwn with respect to the entire number of sub-regions DRall is equal to or smaller than the halation threshold value Nw. The [True] value of the halation detection flag FGst means that white colors are easily generated when performing the luminance range expansion process with the normal expansion factor Gn(n). As described later, the normal expansion factor Gn(n) has a smaller difference from the real expansion factor Gr(n−1) for the previous frame, used in the luminance range expansion process for the previous frame, compared with the ideal expansion factor Gid(n). Therefore, when performing the luminance range expansion process with the normal expansion factor Gn(n) in the scene-change period, it may be difficult to cope with an abrupt image change in the scene-change, for example, a change that such a dark image in the previous frame where a change into the black image state is not detected is abruptly brightened in the present frame and thus there is a possibility of producing halation in the present frame. Therefore, in this embodiment, when the start condition 2 is satisfied, it is determined that the scene-change has occurred and the expansion factor output mode is set to the scene-change mode. The start condition 2 may be satisfied even when the start condition 1 is not satisfied for the dark image in the previous frame.

When any one of the scene-change mode start conditions 1 and 2 is satisfied (Yes in step S2400), the mode determiner 280 determines the expansion factor output mode as the scene-change mode, sets the value of the expansion factor output mode flag FGmd to [scene-change mode], and outputs the value to the expansion factor selector 240 of the expansion factor deriving unit 200 (step S2410). The expansion factor selector 240 outputs the ideal expansion factor Gid(n) as the expansion factor Gr(n) since the value of the expansion factor output mode flag FGmd is [scene-change mode] (step S2420). Meanwhile, when neither of the scene-change mode start condition 1 or 2 is satisfied (No in step S2400), the mode determiner 280 determines whether a black screen mode start condition is satisfied (step S2430).

Black Screen Mode Start Condition: the value of the black screen detection flag FGbk is [True]; and Gid(n)≧Gid(n−1)

The black screen mode start condition is set in accordance with the following concept. As described above, the black screen detection flag FGbk becomes [True] when the white peak value WP is equal to or smaller than the white peak black screen threshold value ThwbG or the APL value is equal to or smaller than the APL black screen threshold value ThabG (step S2250 in FIG. 7). Since the white peak black screen threshold value ThwbG or the APL black screen threshold value ThabG has a sufficiently small value, the [True] value of the black screen detection flag FGbk means that it may produce a black image. Moreover, Gid(n)≧Gid(n−1) means that the ideal expansion factor Gid(n) for the present frame is equal to or greater than the ideal expansion factor Gid(n−1) for the previous frame and thus the present frame is darkened to a level equal to or greater than the previous frame. Accordingly, it almost does not make any problem to determine that a black image is inserted in the present frame. Therefore, when the condition that the value of the black screen detection flag FGbk is [True] and Gid(n)≧Gid(n−1) is satisfied, the process proceeds to the black screen mode.

When the black screen mode start condition is satisfied (Yes in step S2430), the mode determiner 280 determines the expansion factor output mode as the black screen mode, sets the value of the expansion factor output mode flag FGmd to [black screen mode], and outputs the value to the expansion factor selector 240 of the expansion factor deriving unit 200 (step S2440). Then, the expansion factor selector 240 outputs the black screen expansion factor Gs(n) as the expansion factor Gr(n) since the value of the expansion factor output mode flag FGmd is [black screen mode] (step S2450). Meanwhile, when the black screen mode start condition is not satisfied (No in step S2430), the mode determiner 280 determines the expansion factor output mode as the normal mode, sets the value of the expansion factor output mode flag FGmd to [normal mode], and outputs the value to the expansion factor selector 240 of the expansion factor deriving unit 200 (step S2460). Then, the expansion factor selector 240 outputs the normal expansion factor Gn(n) as the expansion factor Gr(n) since the value of the expansion factor output mode flag FGmd is [normal mode] (step S2470).

Next, when the expansion factor output mode for the previous frame is in the scene-change mode (scene-change in step S2100), it is determined whether the following scene-change mode stop conditions are satisfied (step S2480) and the expansion factor output mode is changed from the scene-change mode to the normal mode when either of the scene-change mode stop condition is satisfied.

Scene-change Mode Stop Condition 1: the value of (Gn(n)−Gid(n)) is smaller than a stop threshold value ThstopG (an integer equal to or greater than zero (0)

Scene-change Mode Stop Condition 2: Gid(n)>Gid(n−1)

In the scene-change mode stop condition 1, the value of (Gn(n)−Gid(n)) smaller than the stop threshold value ThstopG means that the difference between the ideal expansion factor Gid(n) and the normal expansion factor Gn(n) is sufficiently small. In this case, since there is little possibility of generating problems when outputting the normal expansion factor Gn(n) in place of the ideal expansion factor Gid(n), the process proceeds to the normal mode where the normal expansion factor Gn(n) is output.

In the scene-change mode stop condition 2, the ideal expansion factor Gid(n) for the present frame greater than the ideal expansion factor Gid(n−1) for the previous frame means that images in the present frame is darker than the images in the previous frame. In this case, since it means there is little possibility of producing halation, there is little possibility of generating problems when outputting the normal expansion factor Gn(n). Therefore, when the scene-change mode stop condition 2 is satisfied, the process proceeds to the normal mode where the normal expansion factor Gn(n) is output in place of the ideal expansion factor Gid(n).

When any one of the scene-change mode stop conditions 1 and 2 is satisfied (Yes in step S2480), the mode determiner 280 sets the value of the dark screen detection flag FGdk to [False] (step S2490), sets the value of the black screen detection flag FGbk to [False] (step S2500), sets the value of the halation detection flag FGst to [False] (step S2510), determines the expansion factor output mode as the normal mode, sets the value of the expansion factor output mode flag FGmd to [normal mode], and outputs the value to the expansion factor selector 240 of the expansion factor deriving unit 200 (step S2520). Then, the expansion factor selector 240 outputs the normal expansion factor Gn(n) as the expansion factor Gr(n) since the value of the expansion factor output mode flag FGmd is [normal mode] (step S2530). Meanwhile, when neither of the scene-change mode stop condition 1 or 2 is satisfied (No in step S2480), the mode determiner 280 determines the expansion factor output mode as the scene-chance mode, sets the value of the expansion factor output mode flag FGmd to [scene-change mode], and outputs the value to the expansion factor selector 240 of the expansion factor deriving unit 200 (step S2540). The expansion factor selector 240 outputs the ideal expansion factor Gid(n) as the expansion factor Gr(n) since the value of the expansion factor output mode flag FGmd is [scene-change mode] (step S2550).

Next, when the expansion factor output mode for the previous frame is in the black screen mode (black screen in step S2100), the screen change detecting process (step S2552) and the histogram analysis process (step S2554) are performed in a similar manner to the case of steps S2200 to S2400 so as to determine whether the scene-change mode start condition is satisfied (step S2556). When the scene-charge mode start condition is satisfied (Yes in step S2556), the value of the expansion factor output mode flag FGmd is set to [scene-change mode] (step S2410) and the ideal expansion factor Gid(n) is output as the expansion factor Gr(n) (step S2420). Meanwhile, when the scene-change mode start condition is not satisfied (No in step S2556), it is determined whether the following black screen mode stop condition is satisfied (step S2560) and the expansion factor output mode is changed from the lack screen mode to the normal mode when the black screen mode stop condition is satisfied.

Black Screen Mode Stop Condition: Gid(n)<Gid(n−1)

In the black Screen mode stop condition, Gid(n)<Gid(n−1) means that the ideal expansion factor Gid(n) for the present frame becomes smaller than the ideal expansion factor Gid(n−1) for the previous frame and thus the image is changing in a brighter direction. Therefore, it may be possible to determine that the image is changing in a direction of stopping the black screen. Therefore, in this case, the process proceeds to the normal mode where the normal expansion factor Gn(n) is output in place of the ideal expansion factor Gid(n).

When the black screen mode stop condition is satisfied (Yes in step S2560), the mode determiner 280 sets the value of the dark screen detection flag FGdk to [False] (step S2490), sets the value of the black screen detection flag FGbk to [False] (step S2500), sets the value of the halation detection flag FGst to [False] (step S2510), determines the expansion factor output mode as the normal mode, sets the value of the expansion factor output mode flag FGmd to [normal mode], and outputs the value to the expansion factor selector 240 of the expansion factor deriving unit 200 (step S2520). Then, the expansion factor selector 240 outputs the normal expansion factor Gn(n) as the expansion factor Gr(n) since the value of the expansion factor output mode flag FGmd is [normal mode] (step S2530). Meanwhile, when the black screen mode stop condition is not satisfied (No in step S2560), the mode determiner 280 determines the expansion factor output mode as the black screen mode, sets the value of the expansion factor output mode flag FGmd to [black screen mode], and outputs the value to the expansion factor selector 240 of the expansion factor deriving unit 200 (step S2570). The expansion factor selector 240 outputs the black screen expansion factor Gs(n) as the expansion factor Gr(n) since the value of the expansion factor output mode flag FGmd is [black screen mode] (step S2580).

Figure 10:
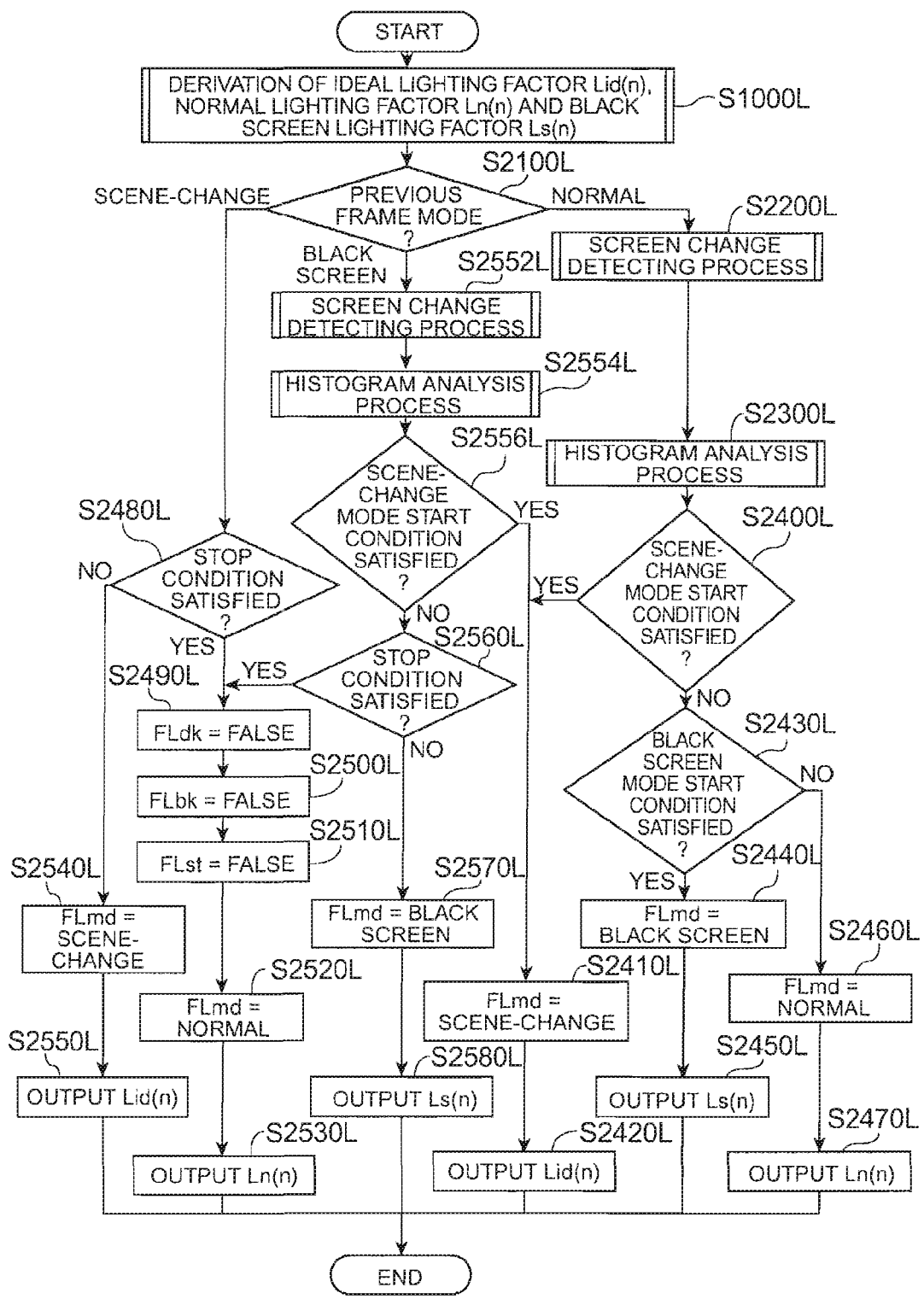
FIG. 10 is a flowchart showing processes of the lighting factor deriving unit 5030 and the lighting factor output mode determining unit 550.

A4. Processes of Lighting Factor Deriving Unit and Lighting Factor Output Mode Determining Unit FIG. 10 is a flowchart showing processes of the lighting factor deriving unit 500 and the lighting factor output mode determining unit 550. As can be seen when comparing FIGS. 6 and 10, the flowchart of FIG. 10 is identical to the flowchart of FIG. 6, except that the symbol G for the expansion factor and the flag is substituted with a symbol L for the lighting factor and the flag. Moreover, since the processes of the lighting factor deriving unit 500 and the lighting factor output mode determining unit 550 are identical to the processes of the expansion factor deriving unit 200 and the expansion factor output mode determining unit 250, the descriptions thereof will be omitted. However, in the case of the lighting control process, since it is controlled to decrease luminance of an image as the screen darkens and increase the luminance of the image as the screen brightens, it is desirable to perform the processes of the scene-change mode when the ideal lighting factor Lid(n) is changing in a direction greater than the normal lighting factor Ln(n) in the dark screen state. Moreover, it is desirable to stop the processes of the black screen mode when the ideal lighting factor Lid(n) is changing in a direction greater than the normal lighting factor Ln(n) in the black screen state. Therefore, the scene-change mode start condition and the scene-change mode stop condition for the lighting control process can be defined as follows:

Scene-change Mode Start Condition 1 for Lighting Control Process: the value of dark screen detection flag FLdk is [True]; and the value of (Lid(n)−Ln(n)) is greater than a start threshold value ThstrL (an integer equal to or greater than zero (0))

Scene-change Mode Start Condition 2 for Lighting Control Process: the value of halation detection flag FLst is [True]

Scene-change Mode Stop Condition 1 for Lighting Control Process: the value of (Lid(n)−Ln(n)) is smaller than a stop threshold value ThstopL; and Scene-change Mode Stop Condition 2 for Lighting Control Process: Lid(n)>Lid(n−1).

The scene-change mode start condition 2 for the lighting control process is not directly related to the lighting control process and thus may be omitted. When omitting the scene-change mode start condition 2 for the lighting control process, the histogram analyzer 560 in FIG. 3 and the processes of step S2300L in FIG. 10 may be omitted.

The black screen mode start condition and the black screen mode stop condition for the lighting control process can be defined as follows:

Black Screen Mode Start Condition for Lighting Control Process: the value of the black screen detection flag Flbk is [True]; and lid(n)≦Lid(n−1); and Black Screen Mode Stop Condition for Lighting Control Process: Lid(n)>Lid(n−1).

In this embodiment, although the mode determination is separately performed by the expansion factor output mode determining unit 250 and the lighting factor output mode determining unit 550, any one of the expansion factor output mode determining unit 250 and the lighting factor output mode determining unit 550 may be omitted and the expansion factor deriving unit 200 and the lighting factor deriving unit 500 may derive the factors on the basis of the mode determination result output from the remaining one of the expansion factor output mode determining unit 250 and the lighting factor output mode determining unit 550. In other words, the video image display device 1000 may include a single mode determining unit. In the case, both the expansion factor output mode and the lighting factor output mode may be set to the normal mode when any one of the following scene-change mode stop conditions 1 to 4 is satisfied.

Scene-change Mode Stop Condition 1: the value of (Gn(n)−Gid(n)) is smaller than the stop threshold value ThstopG Scene-change Mode Stop Condition 2: Gid(n)>Gid(n−1)

Scene-change Mode Stop Condition 3: the value of (Lid(n)−Ln(n)) is smaller than the stop threshold value ThlstopL Scene-change Mode Stop Condition 4: Lid(n)>Lid(n−1).

In addition, the black screen stop condition in the case of having the single mode determining unit may be defined as the following black screen stop conditions 1 and 2, and thus both the expansion factor output mode and the lighting factor output mode are set to the normal mode when any one of the black screen stop conditions 1 and 2 is satisfied.

Black Screen Mode Stop Condition 1: Gid(n)<Gid(n−1)
Black Screen Mode Stop Condition 2: Lid(n)>Lid(n−1)

A5. Derivation of Expansion Factor

Figure 11:
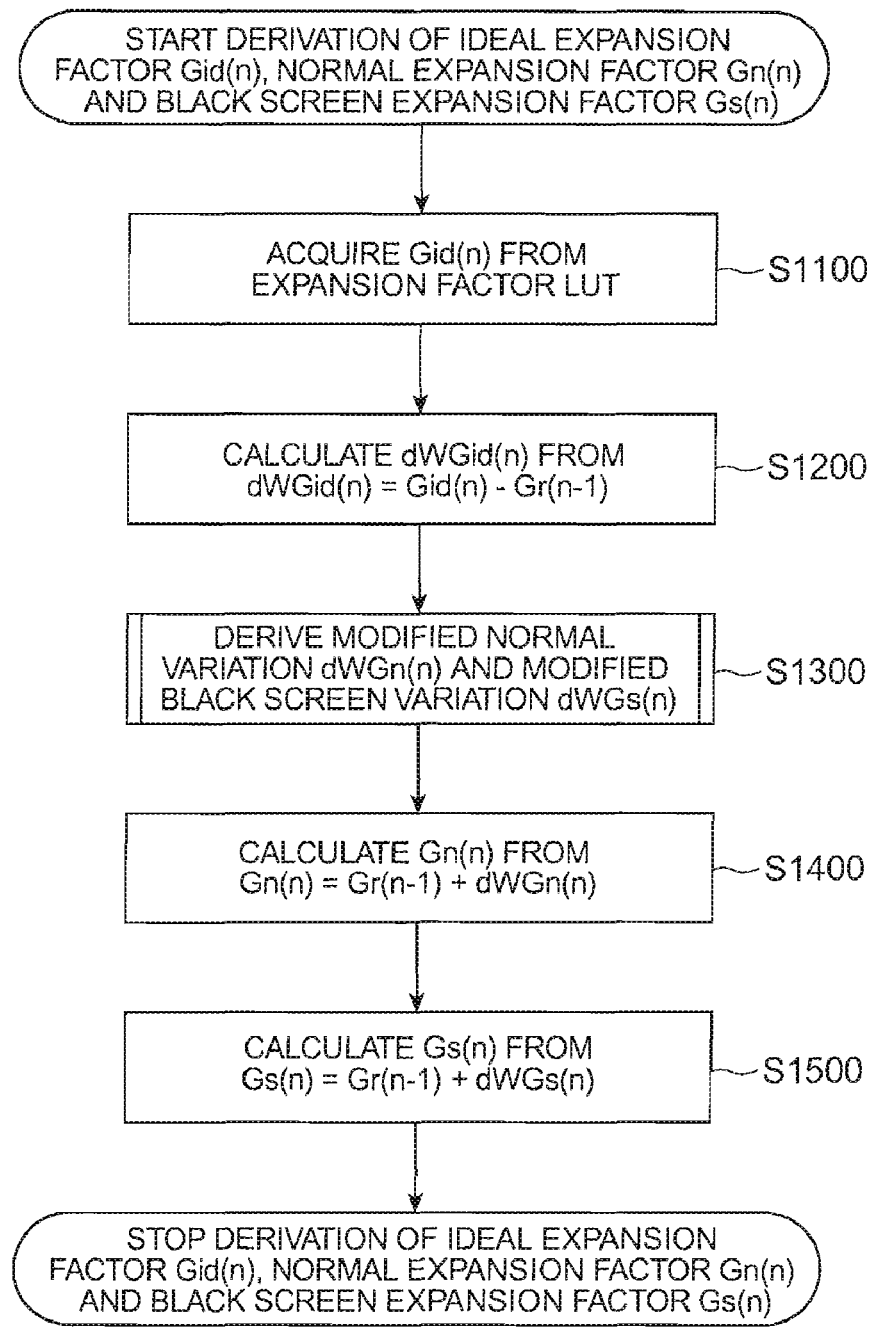
FIG. 11 is a flowchart showing processes for deriving an ideal expansion factor Gid(n), a normal expansion factor Gn(n) and a black screen expansion factor Gs(n).

Hereinafter, the sequence of processes (step S1000 in FIG. 6) in the expansion factor calculator 210 of the expansion factor deriving unit 200 for deriving the ideal expansion factor Gid(n), the normal expansion factor Gn(n) and the black screen expansion factor Gs(n) will be described. FIG. 11 is a flowchart showing processes for deriving the ideal expansion factor Gid(n), the normal expansion factor Gn(n) and the black screen expansion factor Gs(n). First, the expansion factor calculator 210 acquires the ideal expansion factor Gid (n) from the expansion factor LUT 220 (step S1100).

Figure 12:
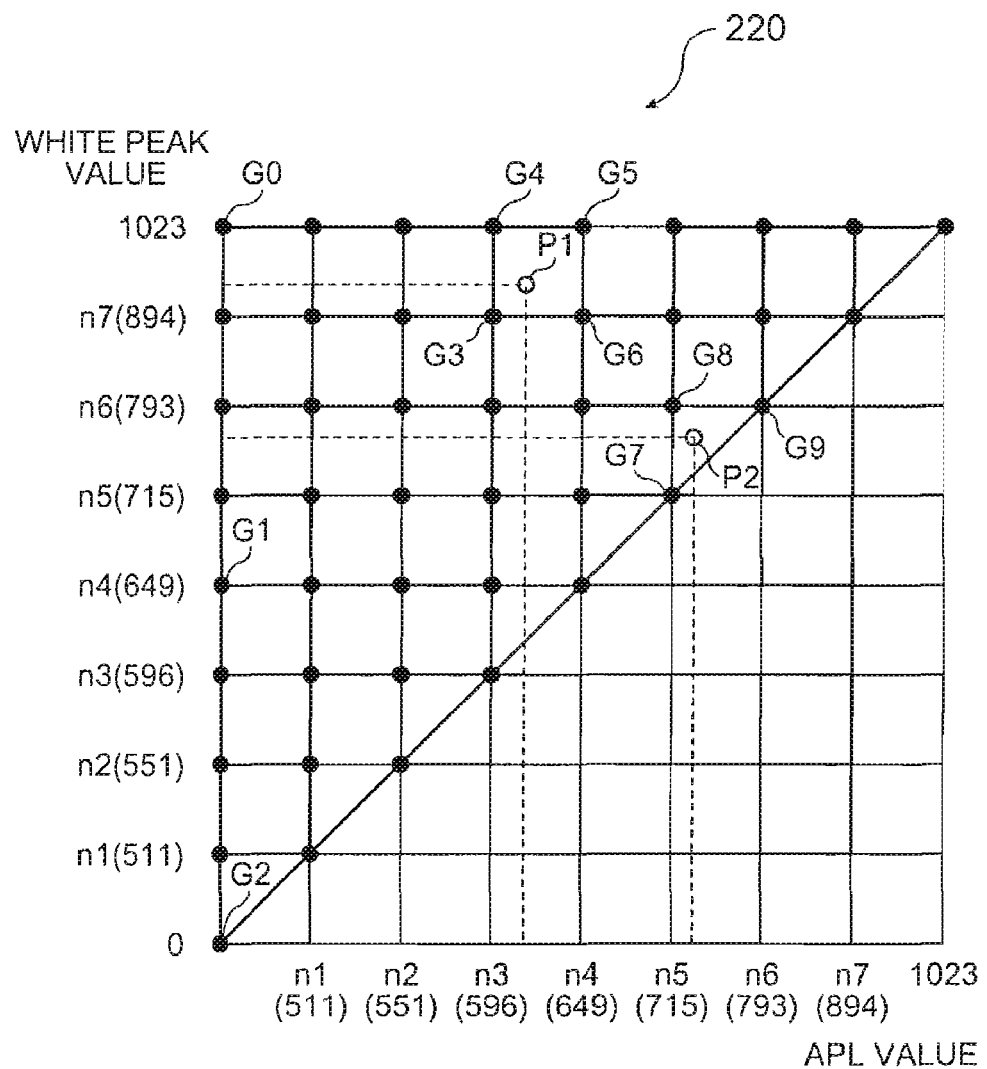
FIG. 12 is a diagram for explaining an example of an expansion factor LUT 220.

FIG. 12 is a diagram for explaining an example of the expansion factor LUT 220. In FIG. 12, the horizontal axis represents the APL value and the vertical axis represents the white peak value WP. n1 to n7 representing coordinates of input lattice points denoted by dark circles are set to an arbitrary integer monotonically increasing in the range of the APL values and the white peak values WP between 0 and 1023. In the example of FIG. 12, the values of n1 to n7 are set in a manner that n1=511, n2=551, n3=596, n4=649, n5=715, n6=793 and n7=894. The ideal expansion factor Gid(n) is stored in each location of the input lattice points. Generally, the ideal expansion factor Gid(n) is set to a smaller value as the white peak value WP becomes greater and to a smaller value as the APL value becomes greater. For example, the ideal expansion factor Gid(n)=0 is stored in the input lattice point G0, the ideal expansion factor Gid(n)=148 is stored in the input lattice point G1, and the ideal expansion factor Gid(n)=255 is stored in the input lattice point G2. The concept of setting the ideal expansion factor will be described later. Since the white peak value WP is greater than the APL value, the ideal expansion factor Gid(n) is not stored in locations corresponding to the input lattice points at the lower-right half of the expansion factor LUT 220, thereby making it possible to reduce a memory size. The value range of the ideal expansion factor Gid(n) can be arbitrarily set in the range of, for example, between 0 and 255.

When the set of the APL value and the white peak value WP for image data corresponds to any one of the input lattice points (dark circles) in FIG. 12, the expansion factor calculator 210 reads out and uses the ideal expansion factor Gid(n) corresponding to the input lattice point. When the set of APL value and the white peak value WP does not correspond to any one of the input lattice points, for example, when the set of APL value and the white peak value WP corresponds to the coordinate P1 or P2, the expansion factor calculator 210 calculates the ideal expansion factor Gid(n) through an interpolation process. As the interpolation process, there are two kinds of interpolation, i.e., a four-point interpolation process which are performed when there are four adjacent input lattice points G3 to G6 as in the case of the coordinate P1 and a three-point interpolation process which are performed when there are only three adjacent input lattice points G7 to G9 as in the case of the coordinate P2.

Figure 13A:
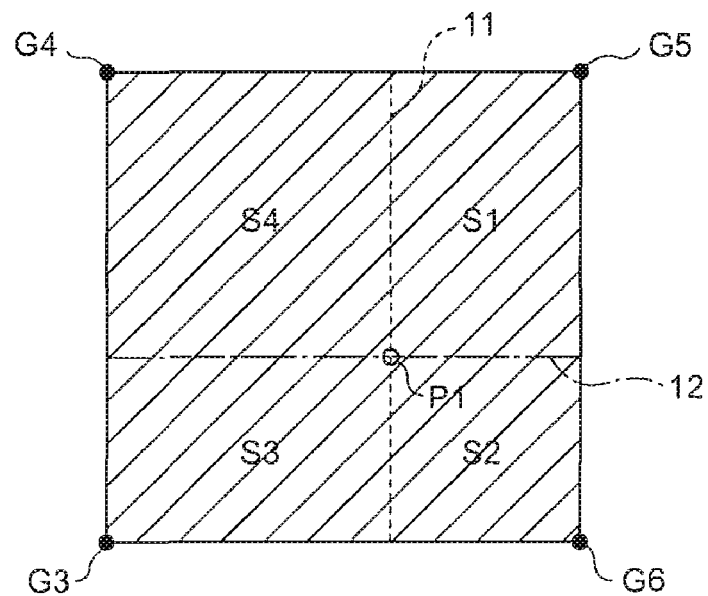
FIGS. 13A and 13B are diagrams for explaining an interpolation process.
Figure 13B:
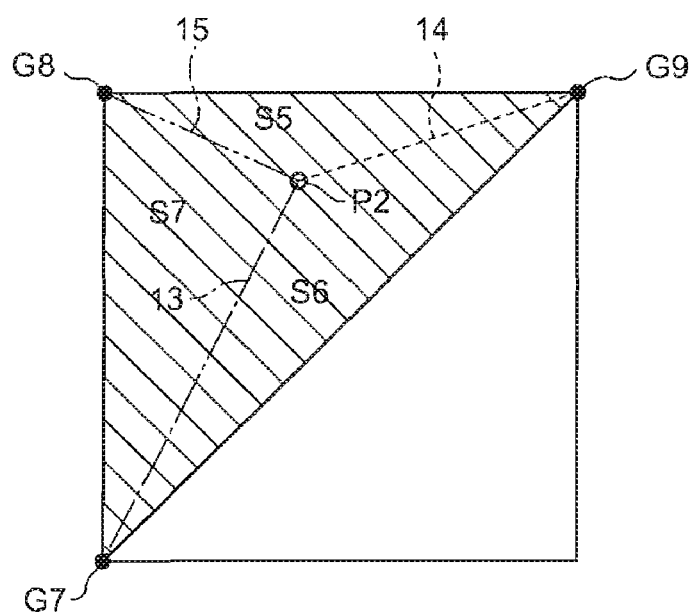

FIGS. 13A and 13B are diagrams for explaining an interpolation process, in which FIG. 13A shows the four-point interpolation process and FIG. 13B shows the three-point interpolation process. Hereinafter, the values of the ideal expansion factor corresponding to the input lattice points G3 to G9 will be denoted by Gv3 to Gv9, respectively. Assuming that areas S1 to S4 in FIG. 13A represent the sizes of regions divided by line segments L1 and L2 passing through the coordinate P1, respectively, and an area S represents the entire size of the hatched region, the ideal expansion factor Gp1 for the coordinate P1 can be calculated by Formula 7.

$$Gp1=(Gv3*S1+Gv4*S2+Gv5*S3+Gv6*S4)/S \quad \text{[Formula 7]}$$

Meanwhile, assuming that areas S5 to S7 in FIG. 13B represent the sizes of regions divided by line segments L3 to L5 ending at the coordinate P2, respectively, and an area Sa represents the entire size of the hatched region, the ideal expansion factor Gp2 for the coordinate P2 can be calculated by Formula 8.

$$Gp2=(Gv7*S5+Gv8*S6+Gv9*S7)/Sa \quad \text{[Formula 8]}$$

In this way, the ideal expansion factor Gid(n) is calculated (step S1100 in FIG. 11).

The expansion factor calculator 210 calculates the ideal variation dWGid(n) which is a difference between the ideal expansion factor Gid(n) and the real expansion factor Gr(n−1) for the previous frame on the basis of Formula 9.

$$dWGid(n)=Gid(n)-Gr(n-1) \quad \text{[Formula 9]}$$

The ideal variation dWGid(n) corresponds to the amount of variation of the ideal expansion factor Gid(n) from the real expansion factor Gr(n−1) for the previous frame. In addition, the ideal variation dWGn(n) corresponds to an ideal expansion factor difference in the embodiment of the invention.

Next, the modified normal variation dWGn(n) and the modified black screen variation d/Gs(n) are calculated on the basis of the ideal variation dWGid(n) (step S1300). The modified normal variation dWGn(n) corresponds to a difference between the normal expansion factor Gn(n) and the real expansion factor Gr(n−1) for the previous frame, and the modified black screen variation dWGs(n) corresponds to a difference between the black screen expansion factor Gs(n) and the real expansion factor Gr(n−1) for the previous frame. In other words, the relations in Formulae 10 and 11 are satisfied.

$$dWGn(n)=Gn(n)-Gr(n-1) \quad \text{[Formula 10]}$$

$$dWGs(n)=Gs(n)-Gr(n-1) \quad \text{[Formula 11]}$$

When the modified variations dWGn(n) and dWGs(n) are obtained, the normal expansion factor Gn(n) and the black screen expansion factor Gs(n) can be calculated. The modified normal variation dWGn(n) corresponds to a first modified expansion factor difference in the embodiment of the invention, and the modified black screen variation dWGs(n) corresponds to a second modified expansion factor difference in the embodiment of the invention.

Figure 14:
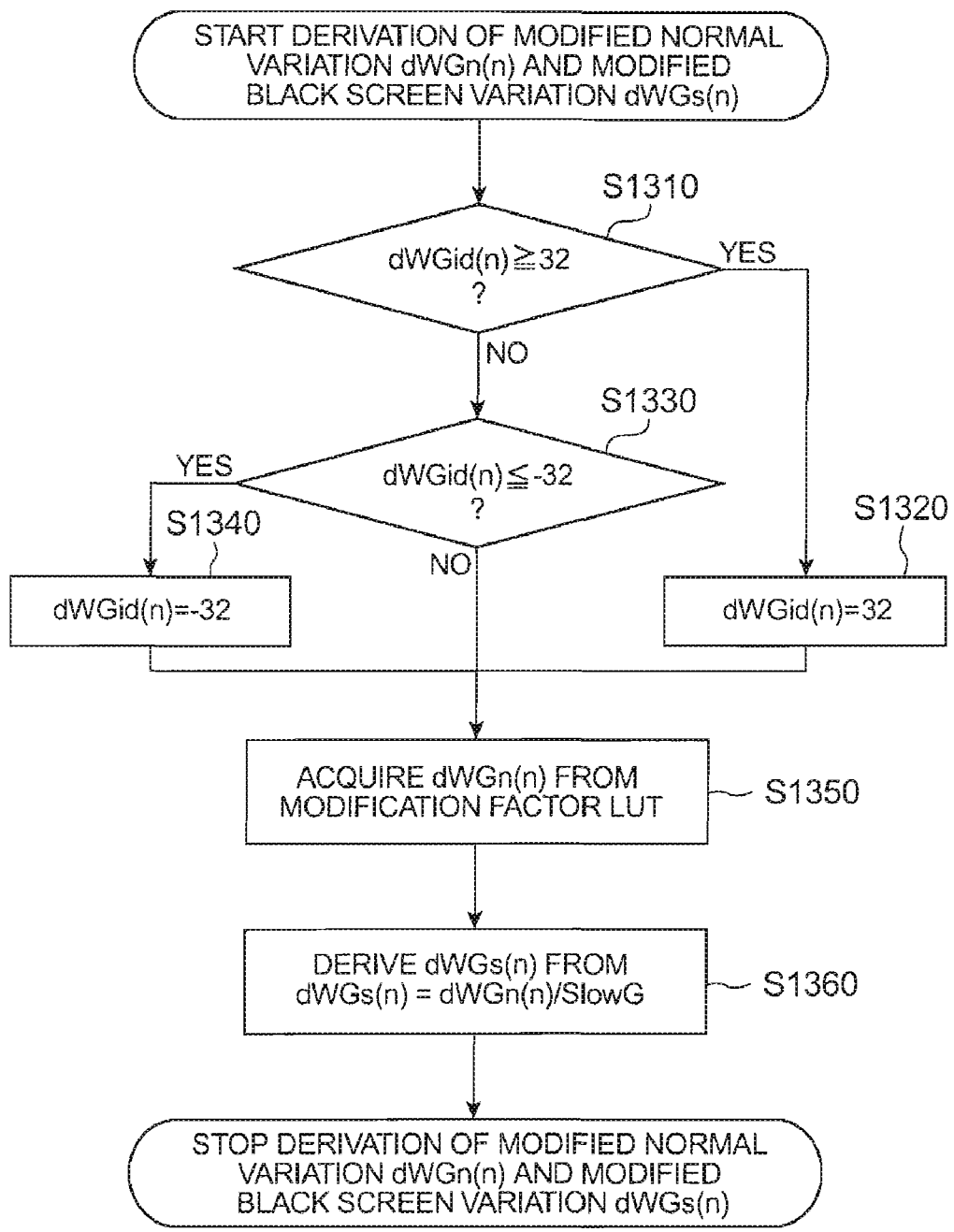
FIG. 14 is a flowchart showing processes for deriving a modified normal variation dWGn(n) and a modified black screen variation dWGs(n).

FIG. 14 is a flowchart showing processes for deriving the modified normal variation dWGn(n) and the modified black screen variation dWGs(n). When the ideal variation dWGid (n) is equal to or greater than 32 (Yes in step S1310), the expansion factor calculator 210 substitutes the ideal variation dWGid(n) with 32 (step S1320). When the ideal variation dWGid(n) is equal to or smaller than −32 (Yes in step S1330), the expansion factor calculator 210 substitutes the ideal variation dWGid(n) with −32 (step S1340). The reason of clipping the ideal variation dWGid(n) is to adjust the ideal variation dWGid(n) so as to fit into an input range of an one-dimensional LUT (modified expansion LUT) 230 used in the derivation of the modified normal variation dWGn(n). The expansion factor calculator 210 acquires the modified normal variation dWGn(n) corresponding to the ideal variation dWGid(n) after the clipping from the modified expansion LUT 230 (step S1350).

The expansion factor calculator 210 calculates the modified black screen variation dWGs(n) by dividing the modified normal variation dWGn(n) by a black screen modification constant SlowG (natural number) on the basis of Formula 12.

$$dWGs(n)=dWGn(n)/\text{SlowG} \quad \text{[Formula 12]}$$

Figure 15:
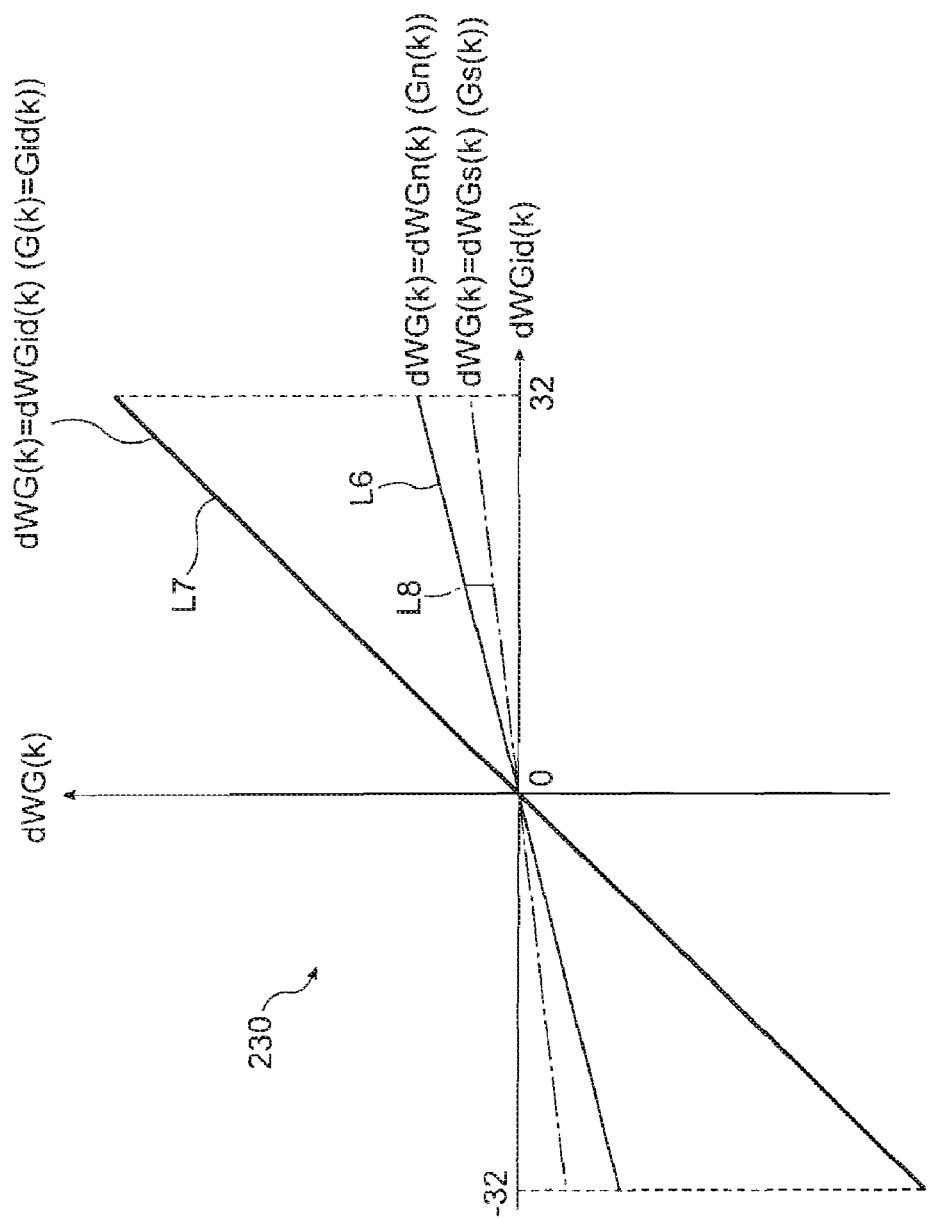
FIG. 15 is a diagram for explaining an input-output relation of a modified expansion LUT 230.

FIG. 15 is a diagram for explaining an input-output relation of the modified expansion LUT 230. In FIG. 15, the horizontal axis represents the ideal variation dWGid(k) and the vertical axis represents the modified variation dWG(k), wherein k is an arbitrary positive integer. A straight line L6 represents the relation between the ideal variation dWGid(k) and the modified variation dWG(k) corresponding to the modified normal variation dWGn(k). The expansion factor calculator 219 derives the modified normal variation dWGn(n) from the ideal variation dWGid(n) using the straight line L6. Moreover, the expansion factor calculator 210 calculates the modified black screen variation dWGs(n) from the modified normal variation dWGn(n) and the black screen modification constant SlowG on the basis of Formula 12. Calculating the modified black screen variation dWGs(n) on the basis of Formula 12 is equivalent to deriving the modified black screen variation dWGs(n) on the basis of the relation, as indicated by a straight line L8 in FIG. 15, between the ideal variation dWGid(k) and the modified variation dWG(k) corresponding to the modified black screen variation dWGs(k).

Returning to FIG. 11, the expansion factor calculator 210 calculates the normal expansion factor Gn(n) on the basis of Formula 13 which is a modified version of Formula 10 (step S1400).

$$Gn(n)=Gr(n-1)+dWGn(n) \quad \text{[Formula 13]}$$

When the ideal variation dWGid(n) is zero (0), it can be seen from the straight line L6 in FIG. 15 that the modified normal variation dWGn(n) is also zero (0) and the normal expansion factor Gn(n) for the present frame is identical to the real expansion factor Gr(n−1) for the previous frame. Since the straight line L6 is used for calculating the normal expansion factor Gn(k), the straight line L6 is shown with a symbol (Gn(k)) embraced with parenthesis.

The expansion factor calculator 210 calculates the modified black screen expansion factor Gs(n) on the basis of Formula 14 which is a modified version of Formula 11 (step S1500).

$$Gs(n)=Gr(n-1)+dWGs(n) \quad \text{[Formula 14]}$$

When the ideal variation dWGid(n) is zero (0), it can be seen from the straight line L8 in FIG. 15 that the modified black screen variation dWGs(n) is also zero (0) and the black screen expansion factor Gs(n) for the present frame is identical to the real expansion factor Gr(n−1) for the previous frame. Since the straight line L8 is used for calculating the black screen expansion factor Gs(k), the straight line L8 is shown with a symbol (Gs(k)) embraced with parenthesis.

Meanwhile, the straight line L7 in FIG. 15 is a line representing the case where the modified variation dWG(k) is identical to the ideal variation dWGid(k). Since the modified variation dWG(k) is identical to the ideal variation dWGid(k) when calculating the modified variation dWG(k) using the straight line L7, it can be seen from Formulae 9 and 10 that the normal expansion factor Gn(k) is identical to the ideal expansion factor Gid(k). In FIG. 15, the straight line L7 is therefore shown with a symbol embraced with parenthesis. In addition, it can be seen from the relation between the straight line L6 and the straight line L7 that the modified normal variation dWGn(k) is set in the modified expansion LUT 230 such that the modified normal variation dWGn(k) has the same sign as the ideal variation dWGid(k) and has an absolute value smaller than the ideal variation dWGid(k).

In this way, since the normal expansion factor Gn(n) is calculated using the modified normal variation dWGn (n) having the same sign as the ideal variation dWGid(n) and having an absolute value smaller than the ideal variation dWGid(n), it can be seen from Formulae 9 and 10 that the normal expansion factor Gn(n) has a smaller difference from the real expansion factor Gr(n−1) for the previous frame, compared with the ideal expansion factor Gid(n). In other words, with the use of the normal expansion factor Gn(n), an abrupt change in the expansion factor changing from the real expansion factor Gr(n−1) for the previous frame can be effectively suppressed, compared with the case of using the ideal expansion factor Gid(n).

For example, when any one of Formulae 15 and 16 is satisfied, the ideal expansion factor Gid(n−1) for the previous frame and the ideal expansion factor Gid(n) or the present frame are greatly changed from the real expansion factor Gr(n−1) for the previous frame. Therefore, when the expansion factor deriving unit 200 outputs the ideal expansion factor Gid(n) in the normal mode, there is a possibility of producing a flickering image. Therefore, the expansion factor deriving unit 200 outputs a modified version of the normal expansion factor Gn(n) in place of the ideal expansion factor Gid(n) in the normal mode, thereby suppressing the flickering of the image.

$$Gid(n-1)>Gr(n-1)>Gid(n) \quad \text{[Formula 15]}$$

$$Gid(n-1)<Gr(n-1)<Gid(n) \quad \text{[Formula 16]}$$

In other words, it is desirable to use the normal expansion factor Gn(n) in the normal mode. Similarly, it is desirable to use the black screen expansion factor Gs(n) smaller than the normal expansion factor Gn(n) in the black screen mode. Meanwhile, since the image data is changing abruptly between frames in the scene-change period, it is desirable to use the ideal expansion factor Gid(n) capable of coping with the abrupt change, compared with the normal expansion factor Gn(n). Since the ideal expansion factor Gid(n) is calculated on the basis of the expansion factor LUT 220 which is set in accordance with the white peak value WP and the APL value, it is possible to perform the luminance range expansion process suitably for the luminance histogram of the image data by using the ideal expansion factor Gid(n). Detailed settings of the expansion factor LUT 220 will be described later.

A6. Luminance Range Expansion Process

The luminance range expansion processing unit 300 expands the luminance range of the image data on the basis of the expansion factor Gr(n) output from the expansion factor deriving unit 200 through steps S1000 to S2580. The luminance range expansion process is performed in accordance with Formulae 17a to 17d. In Formulae 17a to 17d, R0, G0 and B0 represent a color information value of the image data before performing the luminance range expansion process and R1, G1 and B1 represent a color information value of the image data after performing the luminance range expansion process. The expansion ratio K1 is given by Formula 17d.

$$R1=K1*R0 \quad \text{[Formula 17a]}$$

$$G1=K1*G0 \quad \text{[Formula 17b]}$$

$$B1=K1*B0 \quad \text{[Formula 17c]}$$

$$K1=1+Gr(n)/255 \quad \text{[Formula 17d]}$$

The expansion factor Gr(n) is selected from the ideal expansion factor Gid(n), the normal expansion factor Gn(n) and the black screen expansion factor Gs(n) and has a value ranging from 0 to 255. Therefore, the expansion ratio K1 is equal to or greater than 1.

The luminance range expansion processing unit 300 controls the light valve 400 on the basis of the image data after performing the luminance range expansion process.

A7. Derivation of Lighting Factor

Figure 16:
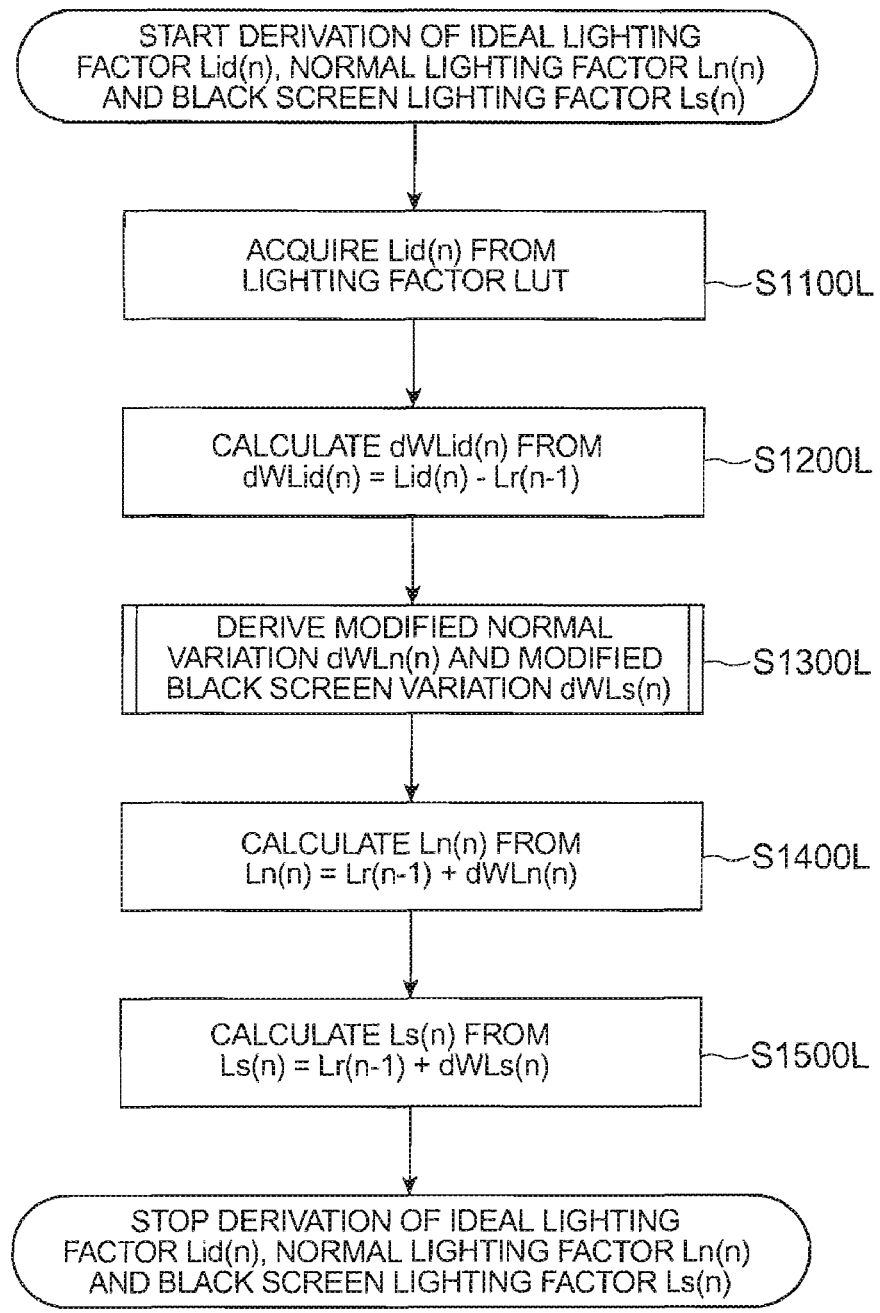
FIG. 16 is a flowchart showing a sequence of processes for deriving an ideal lighting factor Lid(n), a normal lighting factor Ln(n) and a black screen lighting factor Ls(n), corresponding to step S1000L in FIG. 10.

FIG. 16 is a flowchart showing a sequence of processes for deriving the ideal lighting factor Lid(n), the normal lighting factor Ln(n) and the black screen lighting factor Ls(n), corresponding to step S1000L in FIG. 10. As can be seen when comparing FIGS. 11 and 16, the flowchart of FIG. 16 is identical to the flowchart of FIG. 11, except that the symbol G for the expansion factor is substituted with a symbol L for the lighting factor. Moreover, since the sequence of processes for deriving the ideal lighting factor Lid(n), the normal lighting factor Ln(n) and the black screen lighting factor Ls(n) is identical to the sequence of processes for deriving the ideal expansion factor Gid(n), the normal expansion factor Gn(n) and the black screen expansion factor Gs(n), the descriptions thereof will be omitted. However, the ideal lighting factor Lid(n) is calculated on the basis of the lighting factor LUT 520 in FIG. 17.

Figure 17:
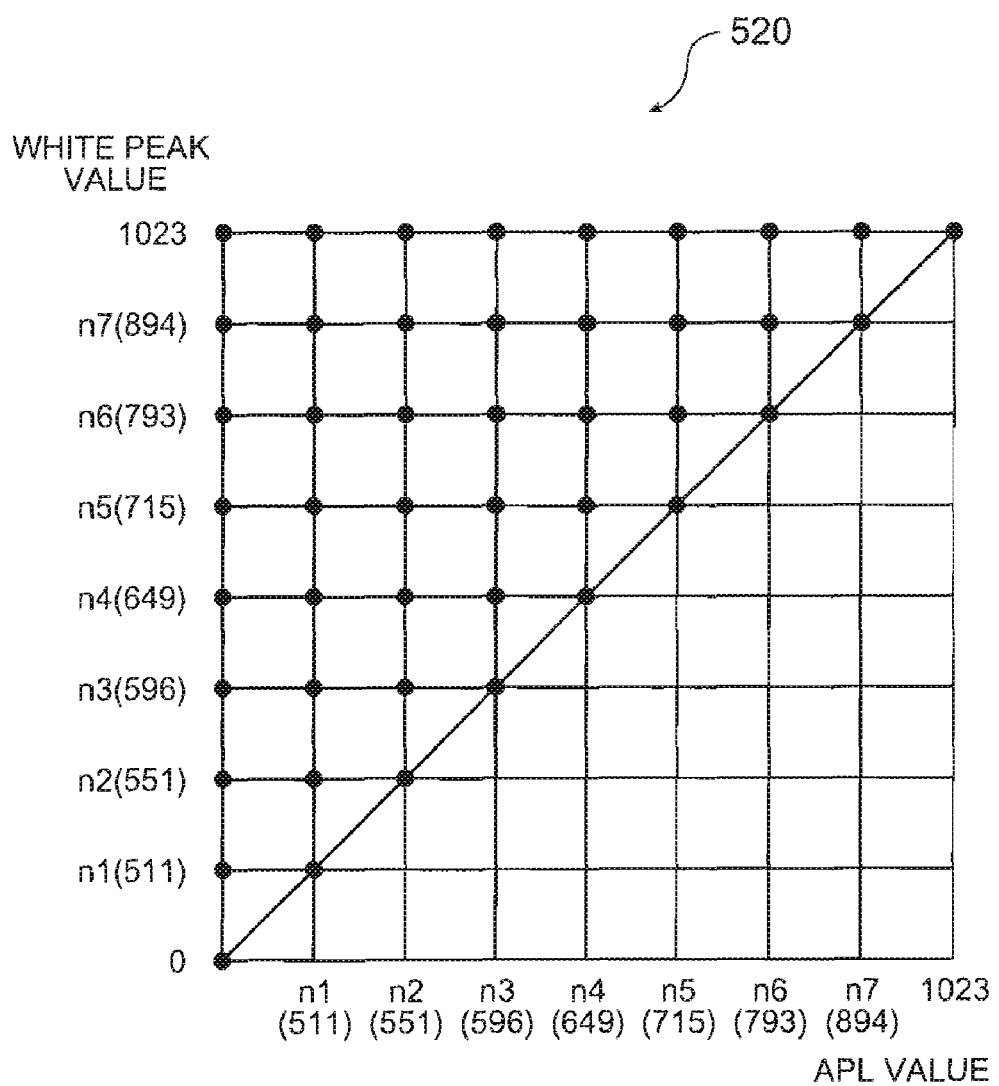
FIG. 17 is a diagram for explaining an example of a lighting factor LUT 520.

FIG. 17 is a diagram for explaining an example of the lighting factor LUT 520. In FIG. 17, the horizontal axis represents the APL value and the vertical axis represents the white peak value WP. As can be seen when comparing FIGS. 12 and 17, the lighting factor LUT 520 has the same structure as the expansion factor LUT 220. Moreover, the method of determining the ideal lighting factor Lid(n) with reference to the lighting factor LUT 520 is identical to the method of determining the ideal expansion factor Gid(n) and detailed description thereof will be omitted.

However, the modified lighting LUT 530 used when deriving the modified normal variation dWLn(n) and the modified black screen variation dWLs(n) in step S1300L of FIG. 16 may be replaced by the modified expansion LUT 230 in step S1300 of FIG. 11 or the modified lighting LUT 530 may be separately provided. In the case of separately providing the modified lighting LUT 530, the modified normal variation dWLn(k) and the modified black screen variation dWLs(k) in the modified lighting LUT 530 have the same sign as the ideal variation dWLid(k) and have an absolute value smaller than the ideal variation dWLid(k).

A8. Lighting Control Process

The lighting control processing unit 600 calculates a light quantity ratio A1, as represented by Formula 18, on the basis of the lighting factor Lr(n) output from the lighting factor deriving unit 500 through steps S1000L to S2580L in FIG. 10 and controls the lighting element 700 on the basis of the light quantity ratio A1. The light quantity ratio A1 represents the proportion of the light quantity with respect to a maximum light quantity and is equal to or smaller than 1 (A1≦1).

$$A1 = Lr(n)/255 \quad \text{[Formula 18]}$$

When the light quantity ratio A1 calculated in Formula 18 and the expansion ratio K1 calculated in Formula 17d have a relation represented by Formula 19 shown below, the maximum luminance of the image obtainable after performing the luminance range expansion process and the lighting control process when both the expansion factor output mode and the lighting factor output mode are in the scene-change mode becomes identical to the maximum luminance of the image obtainable before performing the luminance range expansion process and the lighting control process.

$$A1 = K1^{-\gamma} \quad \text{[Formula 19]}$$

In Formula 19, γ represents the γ value of the light valve 400 and is 2.2, for example. The lighting factor LUT 520 in FIG. 17 is derived from the expansion factor LUT 220 in FIG. 15 such that the relation in Formula 19 is satisfied. In other words, the ideal lighting factor Lid(n) in the lighting factor LUT 520 is set to satisfy the relation in Formula 20.

$$Lid(n)/255 = (1 + Gid(n)/255)^{-\gamma} \quad \text{[Formula 20]}$$

Although, in this embodiment, the expansion factor LUT 220 and the lighting factor LUT 520 are set such that the maximum luminance of the image does not change after performing the luminance range expansion process and the lighting control process, the expansion factor LUT 220 and the lighting factor LUT 520 may be set to satisfy other relations. For example, when the luminance range of the image data is expanded to a relatively wide range through the luminance range expansion process so as to brighten the image, the light quantity may be further increased through the lighting control process so as to more brighten the image. Meanwhile, when the luminance range of the image data is expanded to a relatively narrow range, the light quantity may be further decreased through the lighting control process so as to more darken the image.

Similar to the case of the expansion factor, with the use of the normal lighting factor Ln(n), an abrupt change in the lighting factor changing from the lighting factor Lr(n-1) for the previous frame can be effectively suppressed, compared with the case of using the ideal lighting factor Lid(n). In other words, it is desirable to use the normal lighting factor Ln(n) in the normal mode. Similarly, it is desirable to use the black screen lighting factor Ls(n) smaller than the normal lighting factor Ln(n) in the black screen mode. Meanwhile, since the image date is changing abruptly between frames in the scene-charge period, it is desirable to use the ideal lighting factor Lid(n) capable of coping with the abrupt change, compared with the normal lighting factor Ln(n).

A9. Advantage of Embodiment

According to the video image display device 1000 according to the first embodiment of the invention, since the expansion factor deriving unit 200 outputs the ideal expansion factor Gid(n) suitable for the scene-change when detecting the scene-change, it is possible to perform the luminance range expansion process suitably for the scene-change in the scene-change period. Moreover, since the expansion factor deriving unit 200 outputs the ideal expansion factor Gid(n) until the stop condition is satisfied after detecting the scene-change, it is possible to perform the luminance range expansion process suitably for the scene-change until the stop condition is satisfied after detecting the scene-change.

In addition, since the expansion factor deriving unit 200 outputs the normal expansion factor Gn(n) when the scene-change is not detected and the change into the dark screen state is detected or when both the change into the dark screen state and the change into the black screen state are not detected, it is possible to suppress deterioration of the image quality such as flickering of the image due to the fact that the expansion factor changes abruptly from the previous frame in a normal state where the scene-change is not detected.

In addition, since the expansion factor deriving unit 200 outputs the black screen expansion factor Gs(n) smaller than the normal expansion factor Gn(n) until the stop condition is satisfied when the scene-change is not detected and the change into the black screen state is detected, it is possible to suppress the abrupt change of the expansion factor changing from the previous frame in a state where the black screen state is continued.

Figure 18:
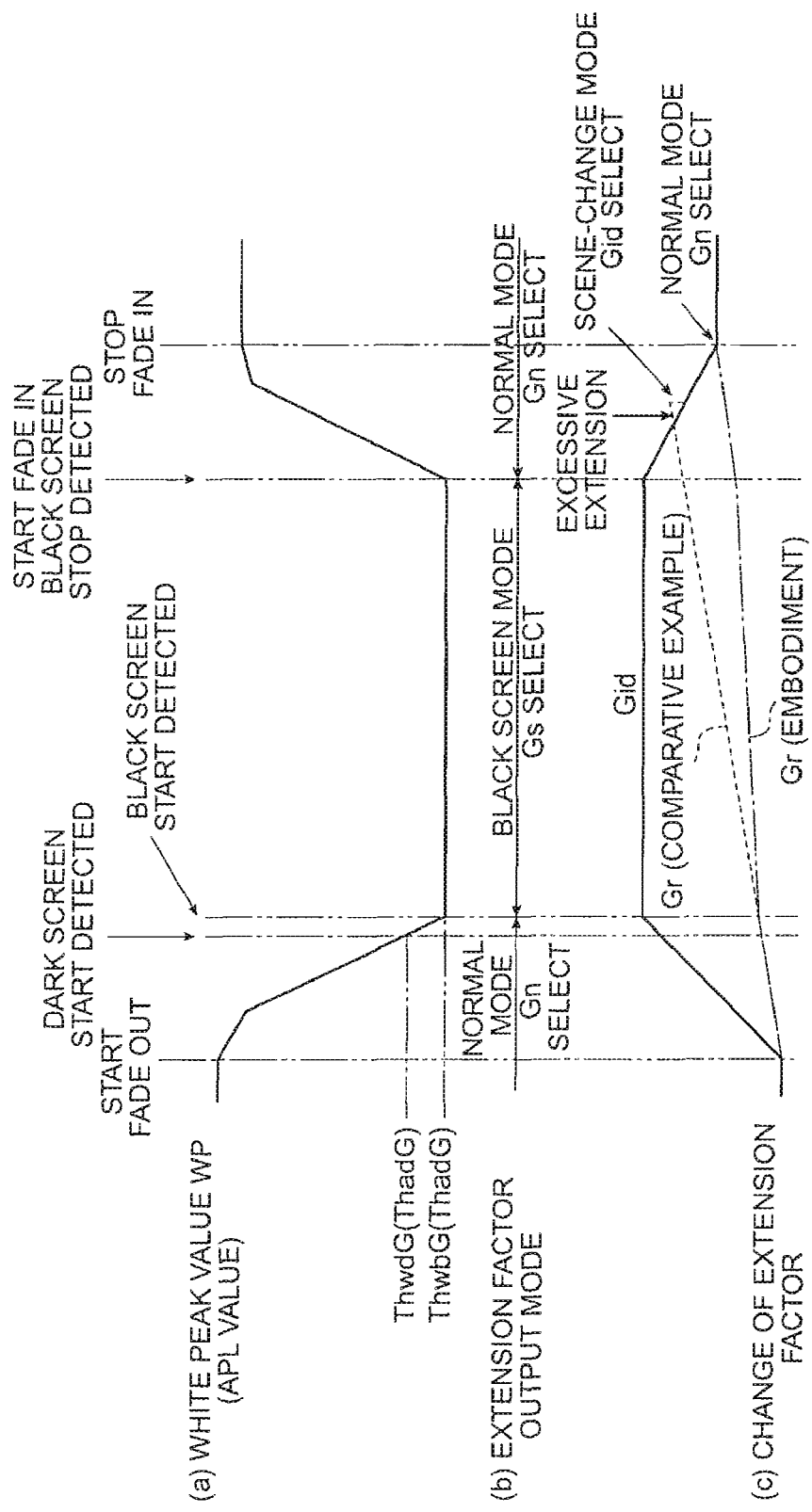
FIG. 18 is a diagram for explaining a detailed example of an expansion factor output from the expansion factor deriving unit 200.

FIG. 18 is a diagram for explaining a detailed example of the expansion factor output from the expansion factor deriving unit 200. In FIG. 18, a diagram (a) shows the change of the white peak value WP and the APL value calculated on the basis of the video image data of each frame by the image characterizing quantity calculating unit 100 in a time-sequential manner. To simplify the illustration of the white peak value WP and the APL value, there is shows an example where the entire image fades out from a first image (hereinafter, will be referred to as a first solid image) having an arbitrary constant luminance value to change into a black image and the black image fades into a second solid image having a different luminance value. In the case of a solid image, the white peak value WP is identical to the APL value. Moreover, the white peak dark screen threshold value ThwdG is identical to the APT dark screen threshold value ThadG, and the white peak black screen threshold value ThwbG is identical to the APL black screen threshold value ThabG. Therefore, since the result of detecting the change into the dark screen state or the change into the black screen state on the basis of the white peak value WP is the same as the case of detecting the change on the basis of the APL value, description will be only made to the case of detecting the change on the basis of the white peak value WP. In FIG. 18, a diagram (b) shows the expansion factor output mode determined, on the basis of the white peak value WP and the APL value in the diagram (a), by the expansion factor output mode determining unit 250 and the type of the expansion factor output from the expansion factor deriving unit 200 in accordance with the determined expansion factor output mode. In FIG. 18, a diagram (c) shows the change of the ideal expansion factor Gid(n) and the expansion factor Gr(n).

As shown in the diagram (a) of FIG. 18, the white peak value WP decreases gradually when the image starts to fade out from the first solid image. Meanwhile, as shown in the diagram (b) of FIG. 18, the expansion factor output mode is maintained at the normal mode until the white peak value WP becomes equal to or smaller than the white peak dark screen threshold value ThwdG. Therefore, the normal expansion factor Gn(n) is selected as the expansion factor Gr(n). Accordingly, the expansion factor Gr(n) changes in accordance with the change of the normal expansion factor Gn(n), as represented by a dashed dotted line in the diagram (c) of FIG. 18.

When the white peak value become smaller than the white peak dark screen threshold value ThwdG, the change into the dark screen state is detected. However, since the ideal expansion factor Gid(n) becomes much greater than the normal expansion factor Gn(n), the value of (Gn(n)−Gid(n)) does not exceed the start threshold value ThstrG, thereby failing to satisfying the scene-change mode start condition 1. Accordingly, the expansion factor output mode is maintained at the normal mode.

When the white peak value WP is decreased to a value equal to or smaller than the white peak black screen threshold value ThwbG, the change into the black screen state is detected. In this case, the expansion factor output mode is changed to the black screen mode, the black screen expansion factor Gs(n) is selected as the expansion factor Gr(n), and the expansion factor Gr(n) is changed in accordance with the change of the black screen expansion factor Gs(n). Since the black screen expansion factor Gs(n) is smaller than the normal expansion factor Gn(n), the change of the expansion factor Gr(n) in the black screen mode is smaller than that in the case of the normal mode. The expansion factor output mode is maintained at the black screen mode when the black screen state is continued.

When the image starts to fade in from the black screen and the white peak value WP is increased to a value greater than the lowest white peak value at the black screen state, thereby satisfying the black screen mode stop condition (Gid(n)<Gid(n−1)), the expansion factor output mode is changed to the normal mode, the normal expansion factor Gn(n) is selected as the expansion factor Gr(n), and the expansion factor Gr(n) is changed in accordance with the change of the normal expansion factor Gn(n).

Even when the normal mode is started after the black screen mode is stopped, the change into the dark screen state is detected while the white peak value WP is equal to or smaller than the white peak dark screen threshold value ThwdG. However, as described above, since the ideal expansion factor Gid(n) becomes greater than the normal expansion factor Gn(n), the value of (Gn(n)−Gid(n)) does not exceed the start threshold value ThstrG, thereby failing to satisfying the scene-change mode start condition 1. Accordingly, the expansion factor output mode is maintained at the normal mode.

In a case where the change into the black screen state is not detected in the fade out period and the expansion factor output mode is maintained at the normal mode, as in a comparative example represented by a broken line in the diagram (c) of FIG. 18, since the normal expansion factor Gn(n) is greater than the black screen expansion factor Gs(n), the slope of the change of the expansion factor Gr(n) increases compared with this embodiment and the expansion factor Gr(n) (equivalent to the normal expansion factor Gn(n)) becomes greater than the ideal expansion factor Gid(n), whereby causing an excessive expansion. Accordingly, the scene-change is detected and the ideal expansion factor Gid(n) is selected as the expansion factor Gr(n). As a result, the expansion factor Gr(n) may change abruptly and the image quality may be deteriorated.

Meanwhile, in this embodiment, since the black screen expansion factor Gs(n) smaller than the normal expansion factor Gn(n) is selected as the expansion factor Gr(n) in the black screen mode, it is possible to decrease the slope of the expansion factor Gr. Accordingly, it is possible to prevent the scene-change due to the excessive expansion from being detected, thereby suppressing the deterioration of the image quality which is produced in the comparative example.

Similarly, according to the lighting factor deriving unit 500, in the case of the scene-change where the scene fades out from a previous scene to change into the black screen and the black screen fades into a next scene, it is possible to prevent the scene-change due to an excessive lighting from being detected, thereby suppressing the deterioration of the image quality.

Figure 19:
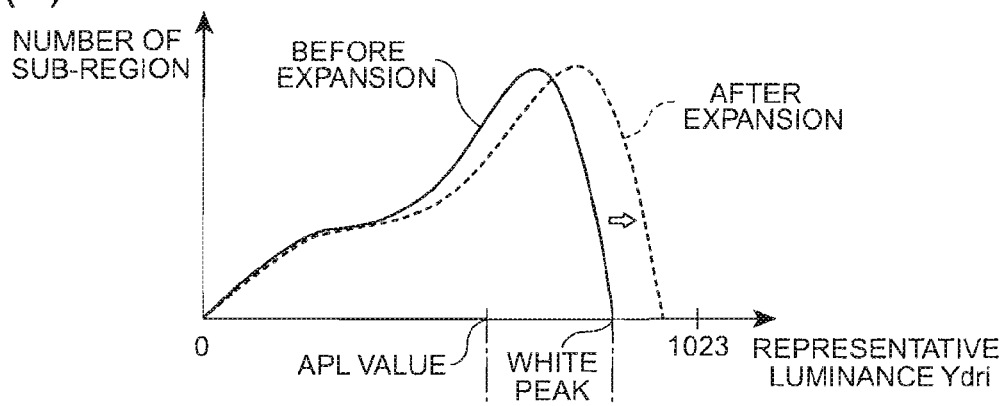
FIG. 19 shows graphs for explaining a concept of setting the ideal expansion factor Gid(n).
Figure 19:
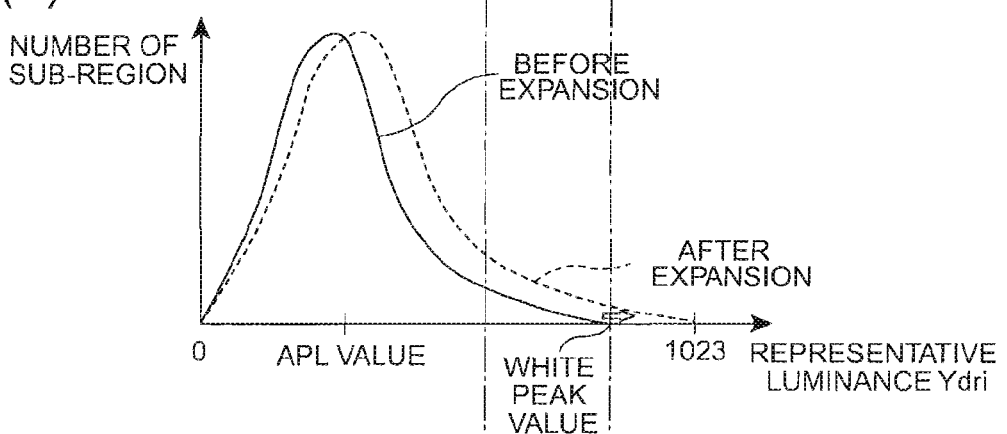
Figure 19:
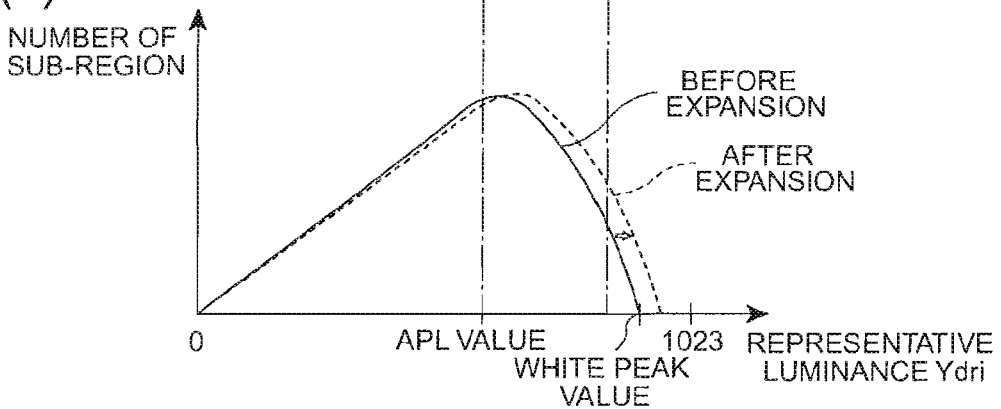

The ideal expansion factor Gid(n) in the expansion factor LUT 220 may be set in accordance with the following criteria. FIG. 19 shows graphs for explaining a concept of setting the ideal expansion factor Gid(n). In FIG. 19, the horizontal axis represents the representative luminance Ydri (i is an arbitrary positive integer) of the i-th sub-region DRi and the vertical axis represents the number of sub-regions DR. In other words, the luminance histogram of FIG. 19 shows a frequency distribution of the representative luminance Ydri of the sub-region DRi. The curve shove by a solid line in FIG. 19 is the luminance histogram for the image data before the luminance range expansion process and shows the white peak value WP and the APL value of the image data before the luminance range expansion process.

In graphs (a) and (b) of FIG. 19, the image data before the luminance range expansion process has the same white peak value WP and different APL value. In the case of the graph (a) of FIG. 19, since the APL value is closer to the white peak value WP compared with the case of the graph (b), the luminance of the entire image gets closer to the white peak value WP. Therefore, in the graph (a), the ideal expansion factor Gid(n) in the expansion factor LUT 220 is set to a small value compared with the case of the graph (b), in order to prevent the halation where most pixels in the entire image are changed to a blurred white image. In the case of the graph (b), since the APL value is small and the proportion of the pixel having luminance close to the white peak value WP with respect to the entire image is small compared with the case of the graph (a), it may be possible to determine that the halation is not produced even when the luminance range expansion process is performed with an increased ideal expansion factor Gid(n). Therefore, in the graph (b), the ideal expansion factor Gid(n) is set to a great value compared with the case of the graph (a), in order to increase the luminance of the entire image. The curves shown by a dotted line in the graphs (a) and (b) of FIG. 19 show the histogram of the image data after the luminance range expansion process by the use of the ideal expansion factor Gid(n) set in the above-mentioned manner. In the graph (a), since the ideal expansion factor Gid is small, a process of lowering the possibility of producing the halation in the image data after the luminance range expansion process is performed. In the graph (b), since the ideal expansion factor Gid(n) is large, the luminance range of the image data is expanded to a wide range compared with the case of the graph (a).

In graphs (a) and (c) of FIG. 19, the image data before the luminance range expansion process has the same APL value and different white peak value WP. In the case of the graph (c) of FIG. 19, since the white peak value WP is large compared with the case of the graph (a), the ideal expansion factor Gid(n) in the expansion factor LUT 220 is set to a small value compared with the case of the graph (a), in order to prevent the halation. The curve shown by a dotted line in the graph (c) of FIG. 19 shows the histogram of the image data after the luminance range expansion process by the use of the ideal expansion factor Gid(n) set in the above-mentioned manner. In the graph (c), since the ideal expansion factor Gid(n) is small, a process of lowering the possibility of producing the halation in the image data after the luminance range expansion process is performed. In this way, the expansion factor LUT 220 is set in consideration of the relation between the APL value and the white peak value WP. In the graphs (a) to (c) of FIG. 19, the luminance range of the image date after the luminance range expansion process is expanded to a wide range compared with the image data before the luminance range expansion process.

Therefore, in the video image display device 1000 according to the first embodiment of the invention, since the luminance range expansion process and the lighting control process are performed on the basis of the white peak value WP and the APL value obtained from the luminance histogram of the image data when both the expansion factor output mode and the lighting mode output mode are in the scene-change mode, it is possible to perform the luminance range expansion process and the lighting control process suitably for the luminance histogram of the image data. In this way, it is possible to improve a sense of contrast of the image. Moreover, by setting the lighting factor LUT 520 on the basis of Formula 20, it is possible to prevent the maximum luminance of the image from changing after the luminance range expansion process and the lighting control process when both the expansion factor output mode and the lighting mode output mode are in the scene-change mode.

In addition, since the image characterizing quantity calculating unit 100 divides one frame into sub-regions to calculate the luminance of the sub-regions and calculates the APL value and the white peak value WP on the basis of the calculated luminance, it is possible to reduce the influence of noise on the image. In this case, the maximum luminance and the average luminance of the sub-regions disposed at a central portion of the image may be used as the APL value and the white peak value WP, respectively. By doing so, it is possible to reduce the influence of a dark stripe found at an edge portion of a caption part or the image. Alternatively, the image characterizing quantity calculating unit 100 may use the maximum luminance of the entire pixels of the image data as the white peak value WP and the average luminance of the entire pixels as the APL value, without dividing the one frame into the sub-regions. In other words, the luminance histograms in FIGS. 5, 8 and 19 may be a luminance histogram for each pixel of the image data.

Although, in this embodiment, the APL value was used as the image characterizing quantity, the black peak value which is the minimum value of the representative luminance Ydr1 to Ydr40 of the sub-regions DRi may be used in place of the APL value. In addition, although, in this embodiment, two values, i.e., the white peak value WP and the APL value were used as the plurality of image characterizing quantity, three values, i.e., the white peak value WP, the APL value and the black peak value may be used. In this case, the expansion factor LUT 220 and the lighting factor LUT 520 are constructed in a three-dimensional LUT. Moreover, a larger number of image characterizing quantities may be used. The plurality of image characterizing quantity is not limited to the white peak value or the APL value and may be set in various manners. The black peak value may be set to the minimum luminance value of the entire pixels.

Since the input-output of the modified expansion LUT 230 is symmetrical to a point of origin in this embodiment, it may be possible to store the data belonging to any one of a positive region and a negative region in the modified expansion LUT 230. Alternatively, it may be possible to store only the modified variation dWG(k) corresponding to an integer value of the ideal variation dWGid(k). In this case, when the ideal variation dWGid(n) does not have an integer value, the modified variation dWG(n) is calculated through an interpolation process.

Although, in this embodiment, the modified expansion LUT 230 is represented by the straight line L6 in order to simplify the illustration, it need not be a straight line and may be represented in various manner, for example, by a curve or a polygonal line. Moreover, so far as the modified normal variation dWGn(n) has the same sign as the ideal variation dWGid(n) and has an absolute value smaller than the ideal variation dWGid(n), the modified normal variation dWGn(n) may be derived in various manner, in place of deriving from the modified expansion LUT 230. For example, the modified normal variation dWGn(n) may be derived by dividing the ideal variation dWGid(n) by an integer greater than 1.

Although, in this embodiment, the modified normal variation dWLn(n) related to the normal lighting factor Ln(n) is derived independently of the calculation of the modified normal variation dWGn(n) related to the normal expansion factor Gn(n), a value having the same absolute value as the modified normal variation dWGn(n) and a sign opposite to the modified normal variation dWGn(n) may be used as the modified normal variation dWLn(n). This is because the abrupt change of the image can be suppressed by controlling the normal expansion factor Gn(n) and the normal lighting factor Ln(n) such that as either value of the normal expansion factor Gn(n) or the normal lighting factor Ln(n) increases, the other factor is decreased by the same amount as the increase of the increased factor.

B. Second Embodiment

The structure of a second embodiment of the invention is the same as the first embodiment, except that the method of calculating the modified normal variation dWGn(n) and the modified black screen variation dWGs(n) in step S1300 of FIG. 11 is different from each other. In the second embodiment, the modified normal variation dWGn(n) and the modified black screen variation dWGs(n) are obtained by multiplying variations dWGn1(n) and dWGs1(n) with the modification factor ScaleG(n), as represented by Formulae 21 and 22.

$$dWGn(n)=dWGn1(n)*ScaleG(n) \quad \text{[Formula 21]}$$

$$dWGs(n)=dWGs1(n)*ScaleG(n) \quad \text{[Formula 22]}$$

Figure 20:
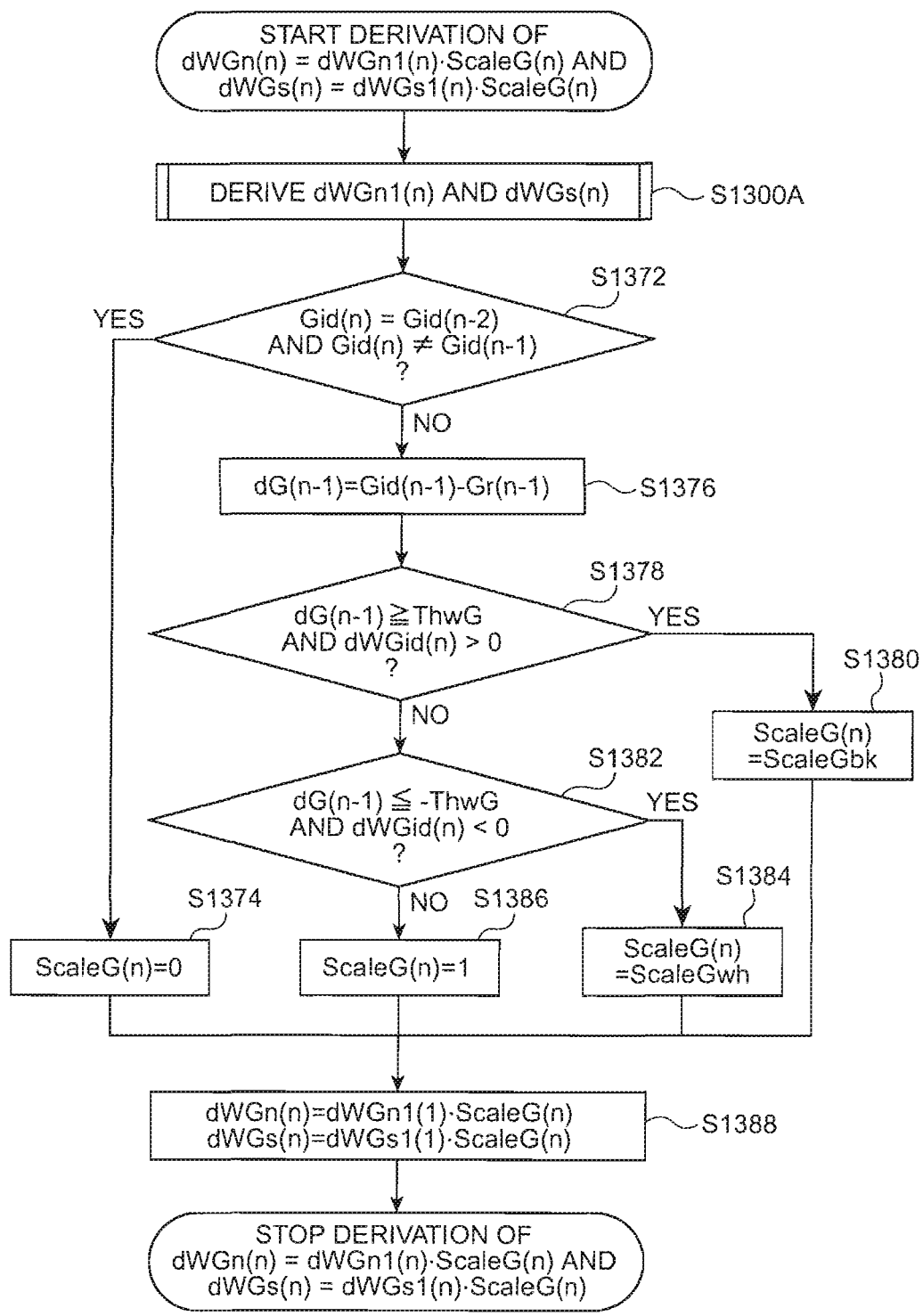
FIG. 20 is a flowchart showing a sequence of processes for deriving a modified normal variation dWGn(n) and a modified black screen variation dWGs(n) according to a second embodiment of the invention.

FIG. 20 is a flowchart showing a sequence of processes for deriving the modified normal variation dWGn(n) and the modified black screen variation dWGs(n) according to the second embodiment of the invention. First, the expansion factor calculator 210 calculates the modified normal variation dWGn(n) and the modified black screen variation dWGs(n) in accordance with the sequence illustrated in the flowchart of FIG. 11 of the first embodiment. Hereinafter, the modified normal variation dWGn(n) and the modified black screen variation dWGs(n) will be referred to as a normal variation dWGn1(n) and a black screen variation dWGs1(n) (step S1300A).

As can be seen from Formulae 21 and 22, the expansion factor calculator 210 only needs to calculate the modification factor ScaleG(n). When Formulae 23 and 24 are satisfied (Yes in step S1372), the expansion factor calculator 210 sets the modification factor ScaleG(n) to zero (0) (step S1374).

$$Gid(n)-Gid(n-2) \quad \text{[Formula 23]}$$

$$Gid(n) \neq Gid(n-1) \quad \text{[Formula 24]}$$

Next, when either of Formula 23 or 24 is not satisfied (No in step S1372), the expansion factor calculator 210 calculates a variation dG(n−1), which is a difference between the ideal expansion factor Gid(n−1) for the previous frame and the real expansion factor Gr(n−1) for the present frame, on the basis of Formula 25 (step S1376).

$$dG(n-1)=Gid(n-1)-Gr(n-1) \quad \text{[Formula 25]}$$

When the variation dG(n−1) of the previous frame is equal to or greater than a threshold value ThwG (natural number) and the ideal variation dWGid(n) of the present frame is greater than zero (0) (Yes in step S1378), the modification factor ScaleG(n) is set to a predetermined black modification factor value ScaleGbk (step S1380). Meanwhile, when the variation dG(n−1) of the previous frame is −ThwG (a negative ThwG) or smaller and the ideal variation dWGid(n) of the present frame is smaller than zero (0) (Yes in step S1382), the modification factor ScaleG(n) is set to a predetermined white modification factor value ScaleGwh (step S1384). Otherwise (No in step S1382), the modification factor ScaleG(n) is set to 1 (step S1386). Then, the modified normal variation dWGn(n) and the modified black screen variation dWGs(n) are calculated on the basis of Formulae 21 and 22 (step S1388). The relation in Formula 26 is satisfied with respect to the modified factor values.

$$1<ScaleGbk<ScaleGwh \quad \text{[Formula 26]}$$

Figure 21:
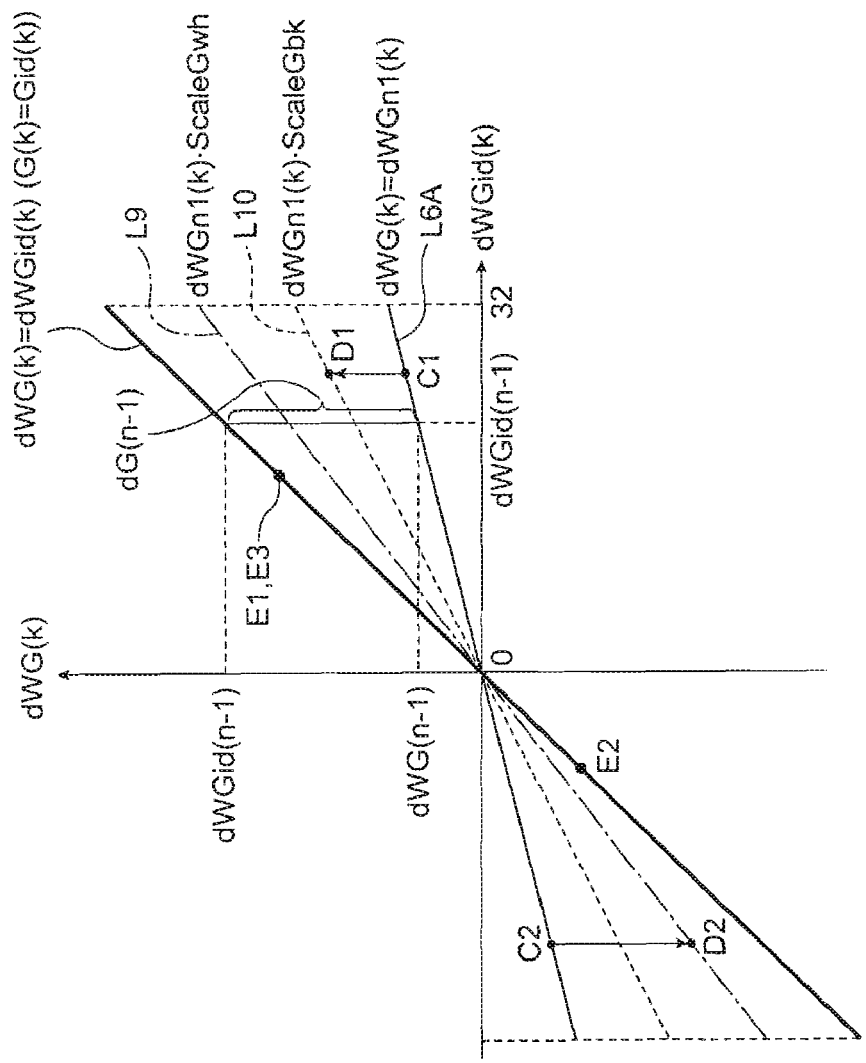
FIG. 21 is a diagram for explaining a concept of setting a scaling factor ScaleG(n).

FIG. 21 is a diagram for explaining a concept of setting the modification factor ScaleG(n). The straight line L6A in FIG. 21 is identical to the straight line L6 in FIG. 15 and straight lines L9 and L10 are added in FIG. 21. The straight line L9 is a line for representing the modified variation dWG(k) corresponding to the modified normal variation dWGn(k) when the modification factor ScaleG(k) is set to the black modification factor ScaleGbk, and the straight line L10 is a line for representing the modified variation dWG(k) corresponding to the modified normal variation dWGn(k) when the modification factor ScaleG(k) is set to the white modification factor value ScaleGwh. Moreover, the straight line L6A is a line for representing the modified variation dWG(k) corresponding to the ideal variation dWGid(k) when the modification factor ScaleG(k) is set to 1. It can be seen from the relation of the straight lines that the modified variation dWG(k) gets closer to the ideal variation dWGid(k) when using the black modification factor value ScaleGbk than using the white modification factor value ScaleGwh. Moreover, it can be seen from the relation in Formulae 9 and 10 that the normal expansion factor Gn(k) gets closer to the ideal expansion factor Gid(k). Similarly, it can be seen that the modified variation dWG(k) gets closer to the ideal variation dWGid(k) when using the black modification factor value ScaleGbk than using the modification factor ScaleG(k) of 1 and that the normal expansion factor Gn(k) gets closer to the ideal expansion factor Gid(k). In this way, the modification factors ScaleGbk and ScaleGwh are set such that the modification factors do not exceed the ideal variation dWGid(k).

Figure 22:
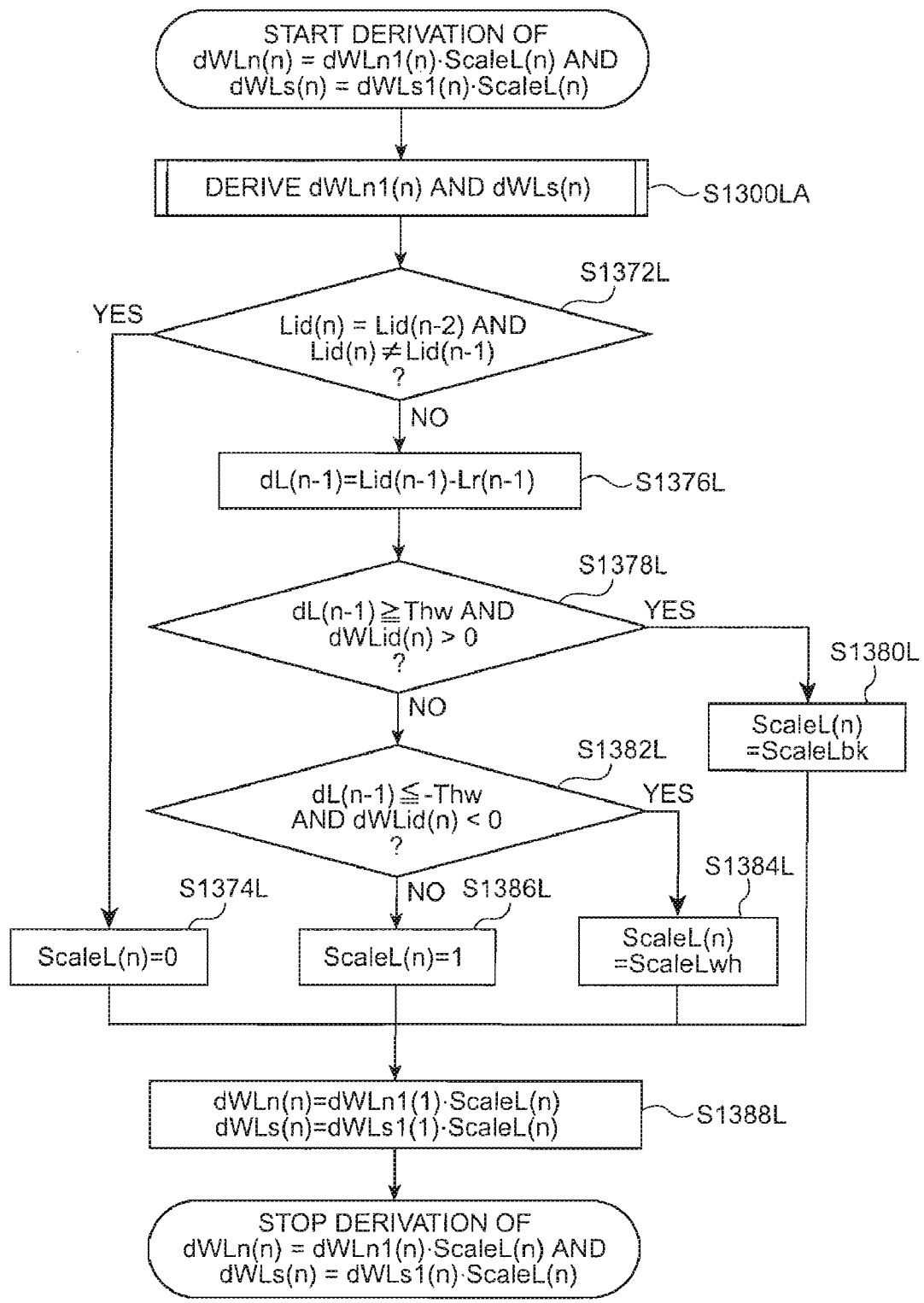
FIG. 22 is a flowchart showing a sequence of processes for deriving a modified normal variation dWLn(n) of a normal lighting factor Ln(n) and a modified black screen variation dWLs(n) of a black screen lighting factor Ls(n).

FIG. 22 is a flowchart showing a sequence of processes for deriving the modified normal variation dWLn(n) of the normal lighting factor Ln(n) and the modified black screen variation dWLs(n) of the black screen lighting factor Ls(n). In a similar manner to the case of the first embodiment, a symbol L is used for the lighting factor. The flowchart of FIG. 22 is identical to the flowchart of FIG. 20, except that the symbol G for the expansion factor is substituted with the symbol L for the lighting factor. Moreover, since the sequence of processes for deriving the modified normal variation dWLn(n) of the normal lighting factor Ln(n) and the modified black screen variation dWLs(n) of the black screen lighting factor Ls(n) is identical to the sequence of processes for deriving the modified normal variation dWGn(n) of the normal expansion factor Gn(n) and the modified black screen variation dWGs(n) of the black screen expansion factor Gs(n), the descriptions thereof will be omitted.

In the video image display device 1000 according to the second embodiment of the invention, by setting the modification factors ScaleG(n) and ScaleL(n), it is possible to adjust the size of the modified normal variation dWGn(n) and the modified black screen variation dWGs(n) in accordance with situation, thereby adjusting the amount of variation of the normal expansion factor Gn(n) for the present frame from the real expansion factor Gr(n−1) for the previous frame and the amount of variation of the black screen expansion factor Gs(n) for the present frame from the real expansion factor Gr(n−1) for the previous frame.

For example, the fact that the variation dG(n−1) for the previous frame is equal to or greater than the threshold value ThwG means that the difference between the ideal expansion factor Gid(n−1) for the previous frame and the real expansion factor Gr(n−1) for the previous frame is extremely great. In this case, as can be seen from Formula 27, which is a modified version of Formulae 9 and 10, since the variation dG(n−1) is the difference between the ideal variation dWGid(n−1) and the modified normal variation dWGn(n~1), the variation dG(n−1) corresponds to the range represented by dG(n−1) in FIG. 21. However, in this case, the modification factor ScaleG (n−1) is assumed to be 1.

$$dG(n-1)=Gid(n-1)-Gr(n-1)=\{dWGid(n-1)+Gr(n-2)\}-\{dWG(n-1)+Gr(n-2)\}=dWGid(n-1)-dWG(n-1) \quad \text{[Formula 27]}$$

Therefore, in the present frame (n-th frame), by deriving the modified normal variation dWGn(n) on the basis of the black modification factor value ScaleGbk greater than 1, the normal expansion factor Gn(n) is moved closer to the ideal expansion factor Gid(n) compared with the case of using the modification factor ScaleG(n) of 1. This corresponds to the movement of coordinates in FIG. 21 where a coordinate C1 corresponding to the case of using the modification factor ScaleG(n) of 1 is moved to a coordinate D1 corresponding to the case of using the black modification factor value ScaleGbk. The fact that the difference between the ideal expansion factor Gid(n−1) for the previous frame and the real expansion factor Gr(n−1) for the previous frame is extremely great means that the ideal expansion factor Gid(n−1) for the previous frame is extremely great and the image before the luminance range expansion process is extremely dark. In this case, it is possible to brighten the image by performing the luminance range expansion process with the normal expansion factor Gn(n) close to the ideal expansion factor Gid(n).

Meanwhile, since the condition for step S1382 in FIG. 20 is opposite to the condition for step S1378, when the relation in Formula 28 is satisfied, it means that the ideal expansion factor Gid(n−1) is extremely small. In other words, it means that the image is extremely bright.

$$Gr(n-1)-Gid(n-1) \geq ThwG \quad \text{[Formula 28]}$$

Therefore, in order to prevent the halation, it is desirable to move the normal expansion factor Gn(n) closer to the ideal expansion factor Gid(n) compared with the case of steps S1378 and S1382 where the image is extremely dark. According to this embodiment, since the modified normal variation dWGn(n) is calculated on the basis of the white modification factor value ScaleGwh much greater than the black modification factor value ScaleGbk in steps S1382 and S1384, it is possible to move the normal expansion factor Gn(n) closer to the ideal expansion factor Gid(n), thereby preventing the halation. This corresponds to the movement of coordinates in FIG. 21 where a coordinate C2 corresponding to the case of using the modification factor ScaleG(n) of 1 is moved to a coordinate D2 corresponding to the case of using the white modification factor value ScaleGwh.

When the ideal variation dWGid(n) has a negative value, the expansion factor calculator 210 derives the normal expansion factor Gn(n) such that the absolute value of the modified normal variation dWGn(n) becomes greater than that obtainable in the case of a positive ideal variation dWGid(n) having the same absolute value.

Although, in this embodiment, the magnitude of the absolute value of the modified normal variation dWGn(n) is adjusted on the basis of the modification factor ScaleG(n), the invention is not limited to this. It is also possible to derive the modified normal variation dWGn(n) by dividing the ideal variation dWGid(n) by a constant greater than 1 suitable for the cases of steps in S1380, S1384 and S1386.

In step S1374, when the ideal expansion factor Gid(n−2) for the (n−2)th frame is identical to the ideal expansion factor Gid(n) for the n-th frame and the ideal expansion factors Gid(n−2) and Gid(n) are not identical to the ideal expansion factor Gid(n−1) for the (n−1)th frame, the values of the ideal variations dWGid(n−2), dWGid(n−1) and dWGid(n) for the ideal expansion factors Gid(n−2), Gid(n−1) and Gid(n) correspond to the values of the coordinates E1, E2 and E3 in FIG. 21, respectively. This means that the ideal expansion factor Gid(k) is fluctuating. In this case, there is a possibility of producing a flickering image when the normal expansion factor Gn(n) is determined on the basis of the ideal expansion factor Gid(n) for the present frame. Therefore, in this embodiment, the modification factor ScaleG(n) is set to zero (0) in step S1374 and the real expansion factor Gr(n−1) for the previous frame is used as the normal expansion factor Gn(n) for the present frame, thereby suppressing the flickering.

The processes in step S1374 may be omitted.

When neither of the conditions for step S1372, S1378 and S1382 is satisfied, by setting the modification factor ScaleG (n) to 1, the same advantage as in the case of the first embodiment is achieved.

Although, in the second embodiment, the modification factor ScaleL(n) related to the normal lighting factor Ln(n) is derived independently of the derivation of modification factor ScaleG(n), the modification factor ScaleL(n) may have the same value as modification factor ScaleG(n). In addition, the black modification factor value ScaleGbk may have the same value as the white modification factor value ScaleGwh.

C. Other Embodiments (1) Although both the luminance range expansion process and the lighting control process were performed in the above-mentioned embodiments, only one of the processes may be performed.

(2) The video image display device 1000 according to the invention can be applied to various video image display devices such as liquid crystal a TVs in addition to the projectors. When only the luminance range expansion process is performed without performing the lighting control process, the light source unit 710 may be omitted.

(3) The method of detecting the scene-change is not limited to those methods illustrated in the above-mentioned embodiments and may be performed in various manners. For example, it may be possible to determine as the scene-change when the image characterizing quantity changes greatly between frames.

While the invention has been particularly shown and described with reference to the embodiments thereof, the video image display device, video image display method and computer program for realizing the video image display device and the video image display method are not limited to the above embodiments, and various changes in form and details may be made therein without departing from the spirit and scope of the invention as defined by the appended claims.

The entire disclosure of Japanese Patent Application No. 2006-067128, filed Mar. 13, 2006 is expressly incorporated by reference herein.

What is claimed is:

1. A video image display device displaying video images on the basis of video image data, the device comprising:
   an expansion factor deriving unit deriving and outputting an expansion factor for each frame of the video image data, for use in a luminance range expansion process for expanding a luminance range of the video image data on the basis of an image characterizing quantity related to the luminance of the video image data corresponding to the frame;
   a luminance range expansion processing unit performing the luminance range expansion process to the video image data on the basis of the expansion factor output from the expansion factor deriving unit; and a scene-change detecting unit detecting a change in a screen state of a present frame into a black screen state on the basis of the video image data and detecting a scene-change indicating that the scene of the video image has changed, wherein the expansion factor deriving unit is configured to:

output an ideal expansion factor of the present frame determined on the basis of the image characterizing quantity related to the present frame when the scene-change is detected;

output a first modified expansion factor of the present frame obtained by modifying the ideal expansion factor of the present frame in accordance with a predetermined first expansion factor modification rule when the scene-change is not detected and the change into the black screen state is not detected; and output a second modified expansion factor of the present frame obtained by modifying the ideal expansion factor of the present frame to a value smaller than the first modified expansion factor of the present frame in accordance with a predetermined second expansion factor modification rule when the scene-change is not detected and the change into the black screen state is detected.

2. The video image display device according to claim 1, wherein the expansion factor deriving unit is configured to:

calculate an ideal expansion factor difference obtained by subtracting a real expansion factor of a previous frame used in the luminance range expansion process for the previous frame by the luminance range expansion processing unit from the ideal expansion factor of the present frame;

derive the first modified expansion factor of the present frame such that an absolute value of the first modified expansion factor difference obtained by subtracting the real expansion factor of the previous frame from the first modified expansion factor of the present frame is smaller than an absolute value of the ideal expansion factor difference and the sign of the first modified expansion factor difference is identical to the sign of the ideal expansion factor difference; and derive the second modified expansion factor of the present frame such that an absolute value of the second modified expansion factor difference obtained by subtracting the real expansion factor of the previous frame from the second modified expansion factor of the present frame is smaller than the absolute value of the first modified expansion factor difference of the present frame and the sign of the second modified expansion factor difference is identical to the sign of the ideal expansion factor difference.

3. The video image display device according to claim 1, wherein the expansion factor deriving unit is configured to:

output the ideal expansion factor until a predetermined scene-change stop condition is satisfied when the scene-change is detected; and output the first modified expansion factor of the present frame when the scene-change stop condition is satisfied.

4. The video image display device according to claim 3, wherein the scene-change stop condition includes at least one of:

a condition that the difference obtained by subtracting the ideal expansion factor of the present frame from the first modified expansion factor of the present frame is equal to or smaller than a predetermined threshold value; and a condition that the ideal expansion actor of the present frame is greater than the ideal expansion factor of the previous frame derived by the expansion factor deriving unit.

5. The video image display device according to claim 1, wherein the expansion factor deriving unit is configured to:

output the second modified expansion factor of the present frame until a predetermined black screen stop condition is satisfied when the scene-change is not detected and the black screen state is detected; and output the first modified, expansion factor of the present frame when the black screen stop condition is satisfied.

6. The video image display device according to claim 1, wherein the scene-change detecting unit is configured to detect the change into the black screen state when a black screen condition is satisfied, the black screen condition including any one of:

a condition that a white peak value corresponding to a maximum luminance value of the image data is equal to or smaller than a predetermined black screen threshold value for the white peak; and a condition that an average level value corresponding to an average luminance level of the image data is equal to or smaller than a predetermined black screen threshold value for the average level.

7. The video image display device according to claim 1, wherein the scene-change detecting unit is configured to detect the scene-change when a start condition is satisfied, the start condition including:

a condition that the screen of the present frame is changed into a dark screen state brighter than the black screen state; and a condition that the difference obtained by subtracting the ideal expansion factor of the present frame from the first modified expansion factor of the present frame is greater than a predetermined threshold value.

8. The video image display device according to claim 7, wherein the scene-change detecting unit is configured to:

detect the change into the black screen state when a black screen condition is satisfied, the black screen condition including any one of a condition that a white peak value corresponding to a maximum luminance value of the image data is equal to or smaller than a predetermined black screen threshold value for the white peak and a condition that an average level value corresponding to an average luminance level of the image data is equal to or smaller than a predetermined black screen threshold value for the average level; and detect the change into the dark screen state when a dark screen condition is satisfied, the dark screen condition including any one of a condition that the white peak value is greater than the black screen threshold value for the white peak and equal to or smaller than a predetermined dark screen threshold value for the white peak and a condition that the average level value is greater than the predetermined black screen threshold value for the average level and equal to or smaller than a predetermined dark screen threshold value for the average level.

9. The video image display device according to claim 1, wherein the scene-change detecting unit is configured to detect the scene-change when the proportion of those images having luminance equal to or greater than a predetermined limit value after performing the luminance range expansion process to the image data using the first modified expansion factor of the present frame, with respect to the entire image, is equal to or greater than a predetermined threshold value.

10. The video image display device according to claim 1, wherein the image characterizing quantity includes a plurality of image characterizing quantities obtainable from a luminance histogram of the image data; and
   wherein the expansion factor deriving unit derives the ideal expansion factor with reference to a predetermined expansion factor lookup table by the use of the plurality of image characterizing quantities.

11. The video image display device according to claim 1, further comprising:
   an illumination device;
   a lighting factor deriving unit deriving and outputting a lighting factor for each frame of the video image data, indicating a light quantity of the illumination device on the basis of the image characterizing quantity; and
   a lighting unit performing a lighting control process of the illumination device on the basis of the lighting factor output from the lighting factor deriving unit,
   wherein the lighting factor deriving unit is configured to:
   output an ideal lighting factor of the present frame determined on the basis of the image characterizing quantity related to the present frame when the scene-change is detected;
   output a first modified lighting factor of the present frame obtained by modifying the ideal lighting factor of the present frame in accordance with a predetermined first lighting factor modification rule when the scene-change is not detected and the change into the black screen state is not detected; and
   output a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected.

12. A video image display device displaying video images on the basis of video image data, the device comprising:
   a illumination device;
   a lighting factor deriving unit deriving and outputting a lighting factor for each frame of the video image data, indicating a light quantity of the illumination device on the basis of an image character zing quantity related to the luminance of the video image data corresponding to the frame;
   a lighting unit performing a lighting control process of the illumination device on the basis of the lighting factor output from the lighting factor deriving unit; and
   a scene-change detecting unit detecting a change in a screen state of a present frame into a black screen state on the basis of the video image data and detecting a scene-change indicating that the scene of the video image has changed,
   wherein the lighting factor deriving unit is configured to:
   output an ideal lighting factor of the present frame determined on the basis of the image characterizing quantity related to the present frame when the scene-change is detected;
   output a first modified lighting factor of the present frame obtained by modifying the ideal lighting factor of the present frame in accordance with a predetermined first lighting factor modification rule when the scene-change is not detected and the change into the black screen state is not detected; and
   output a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected.

13. The video image display device according to claim 12, wherein the lighting factor deriving unit is configured to:
   calculate an ideal lighting factor difference obtained by subtracting a real lighting factor of a precious frame used in the lighting control process for the previous frame by the lighting unit from the ideal expansion factor of the present frame;
   derive the first modified lighting factor of the present frame such that an absolute value of the first modified lighting factor difference obtained by subtracting the real lighting factor of the previous frame from the first modified lighting factor of the present frame is smaller than an absolute value of the ideal lighting factor difference and the sign of the first modified lighting factor difference is identical to the sign of the ideal lighting factor difference; and
   derive the second modified lighting factor of the present frame such that an absolute value of the second modified lighting factor difference obtained by subtracting the real lighting factor of the previous frame from the second modified lighting factor of the present frame is smaller than the absolute value of the first modified lighting factor difference of the present frame and the sign of the second modified lighting factor difference is identical to the sign of the ideal lighting factor difference.

14. The video image display device according to claim 12, wherein the lighting factor deriving unit is configured to:
   output the ideal lighting factor of the present frame until a predetermined scene-change stop condition is satisfied when the scene-change is detected; and
   output the first modified lighting factor of the present frame when the scene-change stop condition is satisfied.

15. The video image display device according to claim 14, wherein the scene-change stop condition includes at least one of:
   a condition that the difference obtained by subtracting the ideal lighting factor of the present frame from the first modified lighting factor of the present frame is equal to or smaller than a predetermined threshold value; and
   a condition that the ideal lighting factor of the present frame is greater than the ideal lighting factor of the previous frame derived by the lighting factor deriving unit.

16. The video image display device according to claim 12, wherein the lighting factor deriving unit is configured to:
   output the second modified lighting factor of the present frame until a predetermined black screen stop condition is satisfied when the scene-change is not detected and the black screen state is detected; and
   output the first modified lighting factor of the present frame when the black screen stop condition is satisfied.

17. The video image display device according to claim 12, wherein the scene-change detecting unit is configured to detect the change into the black screen state when a black screen condition is satisfied, the black screen condition including any one of:
   a condition that a white peak value corresponding to a maximum luminance value of the image data is equal to or smaller than a predetermined black screen threshold value for the white peak; and a condition that an average level value corresponding to an average luminance level of the image data is equal to or smaller than a predetermined black screen threshold value for the average level.

18. The video image display device according to claim 12, wherein the scene-change detecting unit is configured to detect the scene-change when a start condition is satisfied, the start condition including:
   a condition that the screen of the present frame is changed into a dark screen state brighter than the black screen state; and
   a condition that the difference obtained by subtracting the ideal lighting factor of the present frame from the first modified lighting factor of the present frame is greater than a predetermined threshold value.

19. The video image display device according to claim 18, wherein the scene-change detecting unit is configured to:
   detect the change into the black screen state when a black screen condition is satisfied, the black screen condition including any one of a condition that a white peak value corresponding to a maximum luminance value of the image data is equal to or smaller than a predetermined black screen threshold value for the white peak and a condition that an average level value corresponding to an average luminance level of the image data is equal to or smaller than a predetermined black screen threshold value for the average level; and
   detect the change into the dark screen state when a dark screen condition is satisfied, the dark screen condition including any one of a condition that the white peak value is greater than the black screen threshold value for the white peak and equal to or smaller than a predetermined dark screen threshold value for the white peak and a condition that the average level value is greater than the predetermined black screen threshold value for the average level and equal to or smaller than a predetermined dark screen threshold value for the average level.

20. The video image display device according to claim 12, wherein the image characterizing quantity includes a plurality of image characterizing quantities obtainable from a luminance histogram of the image data; and
   wherein the lighting factor deriving unit derives the ideal lighting factor with reference to a predetermined lighting factor lookup table by the use of the plurality of image characterizing quantities.

21. A video image display method for displaying video images on the basis of video image data, the method comprising:
   (a) a step of deriving and outputting an expansion factor for each frame of the video image data, for use in a luminance range expansion process for expanding a luminance range of the video image data on the basis of an image characterizing quantity related to the luminance of the video image data corresponding to the frame;
   (b) a step of performing the luminance range expansion process to the video image data on the basis of the expansion factor output in the (a) step; and
   (c) a step of detecting a change in a screen state of a present frame into a black screen state on the basis of the video image data and detecting a scene-change indicating that the scene of the video image has changed,
   wherein the (a) step is configured to:
   output an ideal expansion factor of the present frame determined on the basis of the image characterizing quantity related to the present frame when the scene-change is detected;
   output a first modified expansion factor of the present frame obtained by modifying the ideal expansion factor of the present frame in accordance with a predetermined first expansion factor modification rule when the scene-change is not detected and the change into the black screen state is not detected; and
   output a second modified expansion factor of the present frame obtained by modifying the ideal expansion factor of the present frame to a value smaller than the first modified expansion factor of the present frame in accordance with a predetermined second expansion factor modification rule when the scene-change is not detected and the change into the black screen state is detected.

22. A video image display method for displaying video images on the basis of video image data in a video image display device having a illumination device, the method comprising:
   (a) a step of deriving and outputting a lighting factor for each frame of the video image data, indicating a light quantity of the illumination device on the basis of an image characterizing quantity related to the luminance of the video image data corresponding to the frame;
   (b) a step of performing a lighting control process of the illumination device on the basis of the lighting factor output in the (a) step; and
   (c) detecting a chance in a screen state of a present frame into a black screen state on the basis of the video image data and detecting a scene-change indicating that the scene of the video image has changed,
   wherein the (a) step is configured to:
   output an ideal lighting factor of the present frame determined on the basis of the image characterizing quantity related to the present frame when the scene-change is detected;
   output a first modified lighting factor of the present frame obtained by modifying the ideal lighting factor of the present frame in accordance with a predetermined first lighting factor modification rule when the scene-change is not detected and the change into the black screen state is not detected; and
   output a second modified lighting factor of the present frame obtained by modifying the ideal lighting factor of the present frame to a value smaller than the first modified lighting factor of the present frame in accordance with a predetermined second lighting factor modification rule when the scene-change is not detected and the change into the black screen state is detected.

* * * * *